US008177679B2

(12) United States Patent
Matsubara et al.

(10) Patent No.: US 8,177,679 B2

(45) Date of Patent: May 15, 2012

(54) CONTROL DEVICE FOR VEHICULAR DRIVE SYSTEM

(75) Inventors: Tooru Matsubara, Toyota (JP); Hiroyuki Shibata, Susono (JP); Atsushi Tabata, Okazaki (JP); Masakazu Kaifuku, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1068 days.

(21) Appl. No.: 12/010,275

(22) Filed: Jan. 23, 2008

(65) Prior Publication Data

US 2008/0182698 A1 Jul. 31, 2008

(30) Foreign Application Priority Data

Jan. 31, 2007 (JP) ................................ 2007-021908
Jun. 15, 2007 (JP) ................................ 2007-159558

(51) Int. Cl.
*F16H 37/08* (2006.01)

(52) U.S. Cl. ............................ 477/3; 477/5; 180/65.23

(58) Field of Classification Search ................ 180/65.1, 180/65.21, 65.285, 65.6; 475/2, 5; 477/3, 477/5; 903/902, 903, 904, 905, 906, 909, 903/912, 913, 917, 918, 919, 945
See application file for complete search history.

(56) References Cited

U.S. PATENT DOCUMENTS 6,018,199 A 1/2000 Shiroyama et al.
6,146,302 A 11/2000 Kashiwase
6,383,106 B1 5/2002 Kashiwase
7,108,087 B2 * 9/2006 Imai ........................... 180/65.23
7,367,919 B2 5/2008 Fahland et al.
7,624,658 B2 12/2009 Fahland et al.
2002/0091028 A1 7/2002 Kashiwase
2004/0251064 A1 * 12/2004 Imai ............................ 180/65.2

FOREIGN PATENT DOCUMENTS

DE 102004028101 A1 1/2005

(Continued)

OTHER PUBLICATIONS

Oct. 11, 2011 Office Action issued in DE Application No. 10 2008 000 191.0 (with English translation).

(Continued)

*Primary Examiner* — J. Allen Shriver, II
*Assistant Examiner* — Bridget Avery
(74) *Attorney, Agent, or Firm* — Oliff & Berridge, PLC

(57) ABSTRACT

A drive system has an electrically controlled differential portion (11) in which a differential state between an input-shaft rotation speed and an output-shaft rotation speed is controlled upon controlling a first electric motor (M1), and a shifting portion (20) and a second electric motor (M2) disposed in a power transmitting path between the electrically controlled differential portion and drive wheels (34). In a control device for controlling the drive system, a rotation direction of an output shaft (18) of the shifting portion is able to be determined without increasing the number of component parts such as a rotation speed sensor. The control device includes rotation direction determination means (86) for determining a rotation direction of an output shaft (22) of an automatic shifting portion (20) based on an engagement of a given coupling element and a detected result of rotation direction detection means (92). This enables the rotation direction of the output shaft 22 of the automatic shifting portion (20) to be suitably detected without increasing the number of component parts such as the rotation speed sensor.

15 Claims, 12 Drawing Sheets

10
INVERTER 54
ELECTRIC-ENERGY STORAGE DEVICE 56
11 16 20 12 72
58 ENGINE-OUTPUT COTROL DEVICE
8 M1 M2 C2 C1 B1 B2 B3
34 32 34
60 62 64 66 68 24 18 26 28 30 22
HYDRAULIC CONTROL UNIT 70
HYBRID CONTROL MEANS 84
STEP-VARIABLE SHIFTING CONTROL MEANS 82
ROTATION DIRECTION DETERMINATION MEANS 86
SHIFT POSITION DETERMINATION MEANS 88
ROTATION DIRECTION DETECTION MEANS 92
VEHICLE SPEED DETERMINATION MEANS 90

FOREIGN PATENT DOCUMENTS

| | | | |
|---|---|---|---|
| DE | 102004046558 | A1 | 4/2006 |
| JP | A-8-183356 | | 7/1996 |
| JP | A-9-37410 | | 2/1997 |
| JP | A-9-98516 | | 4/1997 |
| JP | A-09-170533 | | 6/1997 |
| JP | A-11-217025 | | 8/1999 |
| JP | A-11-270445 | | 10/1999 |
| JP | A-2000-197208 | | 7/2000 |
| JP | A-2000-238555 | | 9/2000 |
| JP | A-2001-339805 | | 12/2001 |
| JP | A-2002-281607 | | 9/2002 |
| JP | A-2005-073499 | | 3/2005 |
| JP | A-2005-264762 | | 9/2005 |
| JP | A-2006-101644 | | 4/2006 |

OTHER PUBLICATIONS

Jan. 24, 2012 Office Action issued in JP Application No. 2007-159558 (with partial English translation).

* cited by examiner

| | C1 | C2 | B1 | B2 | B3 | SHIFTING RATIO | STEP |
|---|---|---|---|---|---|---|---|
| 1st | ○ | | | | ○ | 3.357 | |
| | | | | | | | 1.54 |
| 2nd | ○ | | | ○ | | 2.180 | |
| | | | | | | | 1.53 |
| 3rd | ○ | | ○ | | | 1.424 | |
| | | | | | | | 1.42 |
| 4th | ○ | ○ | | | | 1.000 | |
| R | | ○ | | | ○ | 3.209 | TOTAL 3.36 |
| N | | | | | | | |

○ ENEGAGED

EXAMPLE OF SHIFTING IN POSITION M

D RANGE
↕
4 RANGE
↕
3 RANGE
↕
2 RANGE
↕
L RANGE

START
S11
"N" POSITION SET?
NO
YES
S12
VEHICLE SPEED V < V1?
NO
YES
S13
ESTABLISH 1ST-SPEED GEAR POSITION (C1 AND B3 ENGAGED)
S17
EXECUTE SHIFTING ACCORDING TO AUTOMATIC SHIFTING MAP
S18
EXECUTE OTHER CONTROL
S14
M2 IN NORMAL ROTATION?
NO
YES
S16
DETERMINE REVERSE ROTATION OF OUTPUT SHAFT
S15
DETERMINE NORMAL ROTATION OF OUTPUT SHAFT
RETURN

START

S20
"N→D" SHIFT PRESENT?
No
Yes
S21
C1 ENGAGED?
No
Yes
S22
C2 ENGAGED?
No
Yes
S23
M2<-650rpm?
No
Yes
S24
M2>650rpm?
No
Yes
S25
M2<-650rpm?
No
Yes
S26
M2>650rpm?
No
Yes
S33
EXECUTE OTHER CONTROL
S28
DETERMINE FORWARD RUNNING
S30
DETERMINE FORWARD RUNNING
S31
DETERMINE REVERSE RUNNING
S27
DETERMINE REVERSE RUNNUNG
S29
INDETERMINATE IN DIRECTION
S32
INDETERMINATE IN DIRECTION
RETURN

CONTROL DEVICE FOR VEHICULAR DRIVE SYSTEM

BACKGROUND OF THE INVENTION

1. Field of the Invention

This invention relates to a vehicular drive system including a mechanical type power transmitting portion having a plurality of coupling elements, disposed between a power drive source and drive wheels, which are combined in operation to change a rotation speed of a drive power being output from the drive power source. More particularly, it relates to a control device for a vehicular drive system that can suitably determine a rotation direction of an output shaft of the mechanical type power transmitting portion without increasing the number of component parts.

2. Description of the Related Art

A vehicular drive system has heretofore been well known as including a mechanical type power transmitting portion having a plurality of coupling elements, disposed between a power drive source and drive wheels, which are combined in operation to change i.e., alter a rotation speed of a drive power being output from a drive power source For instance, Patent Publication 1 (Japanese Patent Application Publication No. 2005-264762) discloses a vehicular drive system of such a structure described above. With the control device of such a vehicular drive system, the mechanical type power transmitting portion includes a step-variable type automatic transmission. An overall speed ratio (total speed ratio) of a whole of the drive system is established with a speed ratio of an electrically controlled differential portion, rendered operative to function as a continuously variable transmission, and a speed ratio corresponding to each gear position (shifting position) of the mechanical type power transmitting portion. Further, with the structure disclosed in Patent Publication 1, the control device includes a rotation speed sensor for detecting a rotation speed, corresponding to a vehicle speed, of an output shaft of the mechanical type power transmitting portion.

Besides the foregoing, various technologies have heretofore been known as disclosed in Patent Publication 2 (Japanese Patent Application Publication No. 2001-339805), Patent Publication 3 (Japanese Patent Application Publication No. 8-183356), Patent Publication 4 (Japanese Patent Application Publication No. 2002-281607), Patent Publication 5 (Japanese Patent Application Publication No. 9-37410), Patent Publication 6 (Japanese Patent Application Publication No. 9-98516), Patent Publication 7 (Japanese Patent Application Publication No. 2000-238555) and Patent Publication 8 (Japanese Patent Application Publication No. 2000-197208).

Meanwhile, with the control device for the vehicular drive system disclosed in Patent Publication 1 and other Patent Publications, the rotation direction of the output shaft is determined based on a rotational direction signal detected by a resolver that can detect a rotation speed and rotation direction of, for instance, a second electric motor. In particular, under a circumstance where with the second electric motor and mechanical type power transmitting portion placed in an operatively interlocking state, i.e., in a power transmitting state, the shifting position of the mechanical type power transmitting portion is selected in a forward running gear position like a 1st-speed gear position, the second electric motor and output shaft of the mechanical type power transmitting portion rotate in the same the rotation direction.

In contrast, under a situation where the shifting position of the mechanical type power transmitting portion is selected in a reverse running shift position, the second electric motor and output shaft rotate in rotation directions opposite to each other. Detecting the rotation direction of the second electric motor based on such consequences allows the rotation direction of the output shaft of the mechanical type power transmitting portion to be determined.

However, with the power transmitting path between the second electric motor and mechanical type power transmitting portion placed in an interruptive state, i.e., a neutral condition, the second electric motor and output shaft of the mechanical type power transmitting portion are interrupted in operation. This makes it impossible to determine the rotation direction of the output shaft. Thus, the rotation direction of the output shaft becomes indeterminate. This results in incapability of deciding the magnitude of demanded drive power when the shift position is shifted in a drive position. Thus, a research and development work has been needed to provide a method of determining the rotation direction.

Likewise, a research and development work has been needed to provide a method of determining the rotation direction of the output shaft with high precision even in a drive mode or in a switching mode wherein the power transmitting path is switched from a power cut-off state to a power transmitting state.

The single rotation speed sensor of the related art, disposed on the output shaft, has a capability of detecting the rotation speed but has encountered a difficulty of detecting even the rotation direction of the output shaft. The rotation speed sensor of the related art is mounted in a position closer to an area formed with a convexed and concaved surface like a toothed surface of a gear integrally rotatable with, for instance, the output shaft of the mechanical type power transmitting portion. A variation occurring in distance between the convexed and concaved surface and the rotation speed sensor allows a signal current, caused in a coil of the rotation speed sensor, to be detected. Converting a variation in such a signal current to a voltage allows a pulse to be formed with a speed of such a variation in pulse being detected in conversion to a speed.

Thus, the formation of such a pulse enables the detection of the rotation speed but it is impossible to detect even the rotation direction. On the contrary, a plurality of rotation speed sensors may be equipped to enables the detection of the rotation direction. However, this results in the occurrence of an issue with an increase in the number of component parts with a resultant increase in production cost and an increase in size of the drive system due to an additional number of the rotation speed sensor.

SUMMARY OF THE INVENTION

The present invention has been completed with the above views in mind and has an object to provide, for a vehicular drive system including a mechanical type power transmitting portion having a plurality of coupling elements, disposed between a power drive source and drive wheels, which are combined in operation to alter a rotation speed of a drive power being output from the drive power source, a control device which can suitably determine a rotation direction of an output shaft of the mechanical type power transmitting portion without increasing the number of component parts.

For achieving the above object, the invention in a first aspect is featured by a control device for (a) a vehicular drive system having a power drive source, and a mechanical type power transmitting portion composed of a plurality of coupling elements disposed between the power drive source and drive wheels and operative in combination to change a rotation direction of a drive power delivered from the power drive source, (b) the control device is comprised of rotation direction determination means for determining or a rotation direction determination portion that determines a rotation direction of an output shaft of the mechanical type power transmitting portion based on a rotational speed in a preceding stage of the mechanical type power transmitting portion and a given coupling element under engagement of the mechanical type power transmitting portion.

The invention in a second aspect is featured by that (a) the vehicular drive system includes an electrically controlled differential portion operative to control an operating state of a first electric motor disposed on a succeeding stage of the drive power source and connected to a rotary element of a differential mechanism, for controlling a differential state between an input-shaft rotation speed and an output-shaft rotation speed thereof, and the mechanical type power transmitting portion and a second electric motor both disposed on a power transmitting path between the electrically controlled differential portion and the drive wheels in a power transmissive state, and (b) the control device further includes rotation direction detection means for detecting or a rotation direction detection portions that detects a rotation direction of the first electric motor or the second electric motor, and the rotation direction determination means determines the rotation direction of the output shaft of the mechanical type power transmitting portion based on the given coupling element during engagement of the mechanical type power transmitting portion, and a detected result by the rotation direction detection means.

The invention in a third aspect is featured by that the rotation direction determination means detects the rotation direction based on the rotation direction of the first electric motor or the second electric motor for thereby determining the rotation direction of the output shaft of the mechanical type power transmitting portion.

The invention in a fourth aspect is featured by that the rotation direction determination means determines the rotation direction of the output shaft of the mechanical type power transmitting portion depending on whether the rotation directions of the first electric motor or the second electric motor is greater than a first given rotation speed or less than a second given rotation speed.

The invention in a fifth aspect is featured by that the rotation direction determination means determines the rotation direction of the output shaft of the mechanical type power transmitting portion depending on whether an estimated rotation speed of the first electric motor is greater than a first given rotation speed or less than a second given rotation speed.

The invention in a sixth aspect is featured by that the rotation direction determination means, in a neutral state in which a power transmitting path between the electrically controlled differential portion and the mechanical type power transmitting portion is interrupted, causes the given coupling element to be engaged and controls the electrically controlled differential portion in a power cut-off state upon detecting the rotation direction by the rotation direction detection means.

The invention in a seventh aspect is featured by that the rotation direction determination means allows the rotation direction detection means to begin detecting the rotation direction after the given coupling element began to be engaged, during switching of the power transmitting path from the power cut-off state to the power transmitting state.

The invention in a eighth aspect is featured by that the given coupling element of the vehicular drive system includes a coupling element engageable for both gear positions in a forward running gear position and a reverse running gear position.

The invention in a ninth aspect is featured by that the electrically controlled differential portion of the vehicular drive system is rendered operative as a continuously variable transmission with controlling an operating state of the first electric motor.

The invention in a tenth aspect is featured by the mechanical type power transmitting portion of the vehicular drive system is a step-variable type automatic transmission.

According to the control device for vehicular drive system of the invention in the first aspect, the control device is comprised of rotation direction determination means for determining a rotation direction of an output shaft of the mechanical type power transmitting portion based on a rotational speed in a preceding stage of the mechanical type power transmitting portion and a given coupling element under engagement of the mechanical type power transmitting portion. Therefore, it becomes possible to suitably detect the rotation direction of the mechanical type power transmitting portion without increasing the number of component parts such as a rotation speed sensor.

According to the invention in the second aspect, the rotation direction determination means of the control device determines the rotation direction of the output shaft of the mechanical type power transmitting portion based on the given coupling element during engagement of the mechanical type power transmitting portion, and a detected result of the rotation direction detection means. Therefore, it becomes possible to suitably detect the rotation direction of the mechanical type power transmitting portion without increasing the number of component parts such as a rotation speed sensor.

According to the invention in the third aspect, the rotation direction determination means detects the rotation direction based on the rotation direction of the first electric motor or the second electric motor for thereby determining the rotation direction of the output shaft of the mechanical type power transmitting portion. Therefore, it becomes possible to suitably detect the rotation direction of the mechanical type power transmitting portion without increasing the number of component parts such as a rotation speed sensor.

According to the invention in the fourth aspect, the rotation direction determination means determines the rotation direction of the output shaft of the mechanical type power transmitting portion depending on whether the rotation directions of the first electric motor or the second electric motor is greater than a first given rotation speed or less than a second given rotation speed. Therefore, it becomes possible to avoid occurrence of an erroneous detection of the rotation direction of the first electric motor or second electric motor due to unsteadiness in rotation speed thereof.

According to the invention in the fifth aspect, the rotation direction determination means determines the rotation direction of the output shaft of the mechanical type power transmitting portion depending on whether an estimated rotation speed of the first electric motor is greater than a first given rotation speed or less than a second given rotation speed. Therefore, it becomes possible to avoid occurrence of an erroneous detection of the rotation direction of the first electric motor due to unsteadiness in estimated rotation speed thereof.

According to the invention in the sixth aspect, the rotation direction determination means, in a neutral state in which a power transmitting path between the electrically controlled differential portion and the mechanical type power transmitting portion is interrupted, causes the given coupling element to be engaged and controls the electrically controlled differential portion in a power cut-off state upon detecting the rotation direction by the rotation direction detection means.

Therefore, it becomes possible to determine the rotation direction of output shaft of the mechanical type power transmitting portion that is normally hard to be determined under the neutral condition of the power transmitting route. In addition, by controlling the electrically controlled differential portion in the power cut-off state during the neutral condition, a whole of the drive system is maintained in a neutral condition even if the given coupling element of the mechanical type power transmitting portion is engaged. This avoids a variation in running condition of a vehicle due to an engagement of the coupling element.

According to the invention in the seventh aspect, the rotation direction determination means allows the rotation direction detection means to begin detecting the rotation direction after the given coupling element began to be engaged, during switching of the power transmitting path from the power cut-off state to the power transmitting state.

Therefore, the rotation direction of the output shaft is determined under a condition where the output shaft of the mechanical type power transmitting portion and the electrically controlled differential portion are connected in a power transmissive state. This allows the rotation direction of the output shaft to be detected in high precision during switchover.

According to the invention in the eighth aspect, the given coupling element of the vehicular drive system includes a coupling element engageable for both gear positions in a forward running gear position and a reverse running gear position. Therefore, preliminarily engaging a common coupling element engaged when establishing a 1st-speed shift position or a reverse running shifting position minimizes the number of coupling elements to be engaged during an engagement, enabling a shifting operation to be rapidly initiated.

In a vehicular drive system in the ninth aspect, the electrically controlled differential portion rendered operative as an electrically controlled continuously variable transmission, and a step-variable type automatic transmission constitute a continuously variable transmission, enabling drive torque to be smoothly varied. In addition, under a situation where the electrically controlled continuously variable transmission is controlled to have a speed ratio remained at a fixed value, the electrically controlled continuously variable transmission and the step-variable type automatic transmission establish a state equivalent to that of the step-variable transmission. This allows the vehicular drive system to vary the overall speed ratio step-by-step, thereby rapidly obtaining drive torque.

In a vehicular drive system in the tenth aspect, the electrically controlled differential portion and the mechanical type power transmitting portion constitute a continuously variable transmission, enabling drive torque to be smoothly varied. In addition, the electrically controlled differential portion is able to continuously vary the speed ratio to be operative as the electrically controlled continuously variable transmission while varying the speed ratio step-by-step i.e., stepwise to be operative as the step-variable transmission.

Preferably, the first given speed is set to a rotation speed higher than a value of zero and the second given speed is set to a rotation speed less than the value of zero. With such setting, the rotation direction of the output shaft can be determined in consideration of unsteadiness in rotation speed of the first electric motor and second electric motor.

Preferably, the first and second given rotation speeds are suitably altered during the switchover of the power transmitting path and depending on a vehicle condition such as a steady mode. With such alteration, for the rotation speed of the first and second electric motors having an increased unsteadiness like that appearing during for instance the switchover, the first given rotation speed is set to an increased level and the second given rotation speed is set to a decreased level (with an increase in a negative direction). This avoids the occurrence of erroneous detection of the rotation direction.

If the rotation speeds of the first and second electric motors have a lessened unsteadiness during a state like the steady state, the first given rotation speed is set to the increased level (at a level closer to zero). Even with such setting, the erroneous detection of the rotation direction of the electric motor can be avoided, enabling the rotation direction to be determined in an expanded range. This enables the first and second given rotation speeds to be properly set depending on a vehicle condition such as a coupling element engaging mode and a steady state.

More preferably, the differential mechanism includes a planetary gear set comprised of a first element connected to the power drive source, a second element connected to the first electric motor, and a third element connected to the power transmitting member. The first element includes a carrier of the planetary gear set; the second element includes a sun gear of the planetary gear set; and the third element includes a ring gear of the planetary gear set. With such a structure, the differential mechanism has a minimized axial direction. In addition, the differential mechanism can be simply structured with a single planetary gear set.

More preferably, the planetary gear set includes a single pinion type planetary gear set. With such a structure, the differential mechanism has a minimized axial direction. In addition, the differential mechanism can be simply structured with the single pinion type planetary gear set.

More preferably, the vehicular drive system establishes an overall speed ratio based on the speed ratio (gear ratio) of the mechanical type power transmitting portion and the power transmission of the electrically controlled transmission portion. With such a structure, utilizing the speed ratio of the mechanical type power transmitting portion enables the drive power to be obtained in a wide range.

More preferably, the rotation direction detection means, operative to detect the rotation direction of the second electric motor, includes a rotation speed sensor of a resolver type. With such a structure, the resolver detects a rotation angle of the output shaft for thereby detecting a rotation speed based on a variation in the rotation angle within a fixed time interval, enabling the rotation direction to be detected based on the variation in rotation angle. Moreover, the resolver, less influenced with noises and superior in environment resistance such as temperatures and vibrations, can be properly used as the rotation speed sensor mounted in the transmission.

BRIEF DESCRIPTION OF THE DRAWINGS

FIG. 1 is a skeleton diagram showing a structure of a drive system of one embodiment according to the present invention for use in a hybrid vehicle.

FIG. 2 is an engagement operation table illustrating a combination in operations of hydraulically operated frictional coupling devices for use in performing shifting operations in the drive system shown in FIG. 1.

DETAILED DESCRIPTION OF THE PREFERRED EMBODIMENS

Figure 3:
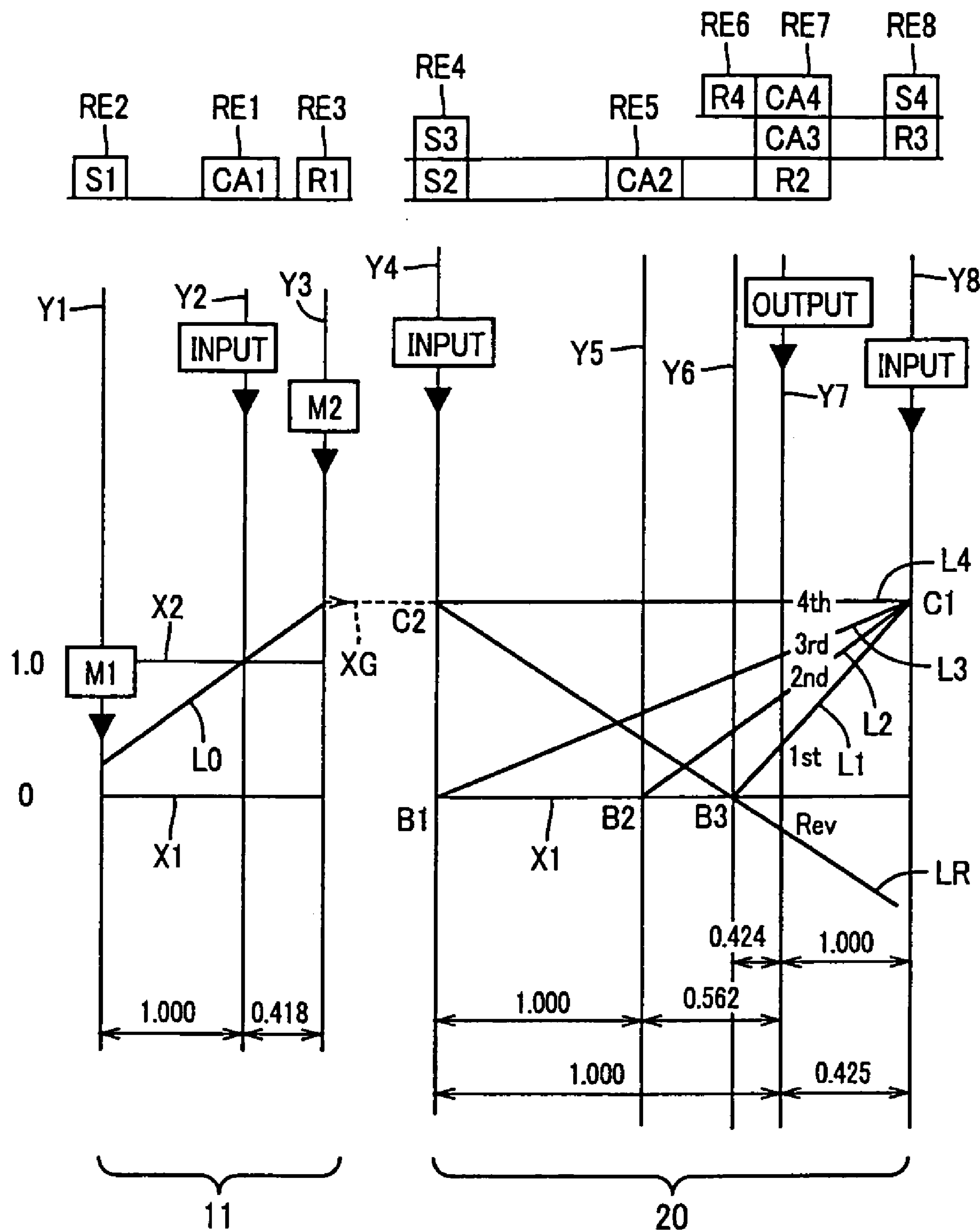
FIG. 3 is a collinear chart illustrating mutually relative rotation speeds at various gear positions in the drive system shown in FIG. 1.

Now, various embodiments according to the present invention will be described below in detail with reference to the accompanying drawings.

<First Embodiment>

Figures 1, 2:
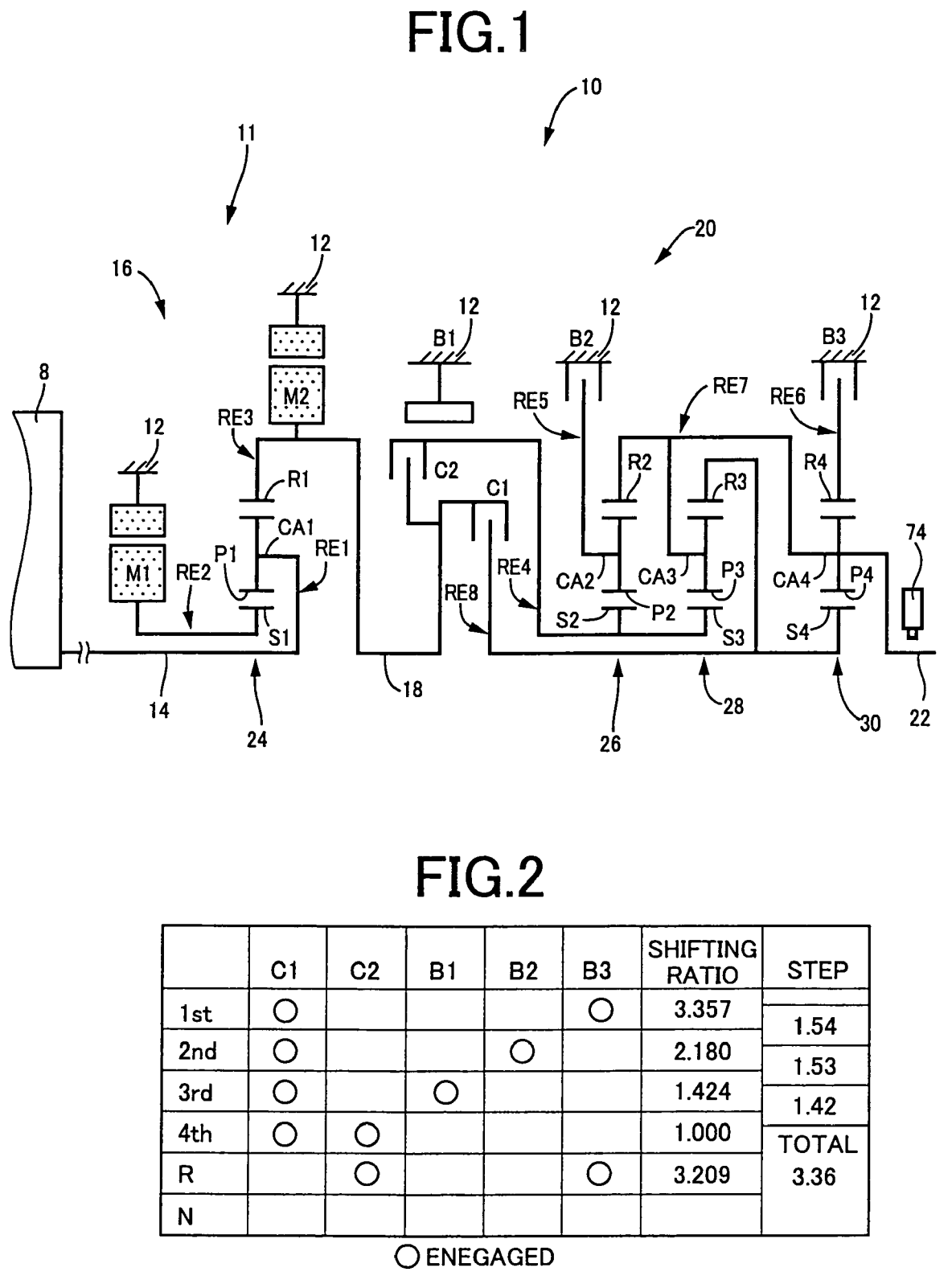

FIG. 1 is a skeleton diagram for illustrating a shifting mechanism 10 constituting a part of a drive system for a hybrid vehicle to which the present invention is applied. As shown in FIG. 1, the shifting mechanism 10 includes a transmission case 12, an input shaft 14, an electrically controlled differential portion 11, an automatic transmission portion 20, and an output shaft 22. In detail, the transmission case (hereinafter referred to as "a case 12") is mounted on a vehicle body as a non-rotary member, and the input shaft 14 is coaxially disposed inside the case 12 as an input rotary member.

The electrically controlled differential portion 11 (hereinafter referred to as a "differential portion 11") is coaxially connected to the input shaft 14 either directly or indirectly via a pulsation absorbing damper (vibration damping device) not shown, and serving as a continuously variable shifting portion. The automatic transmission portion 20 is connected in series in a power transmitting path between the differential portion 11 and drive wheels 34 (see FIG. 7) through a power transmitting member 18 (power transmitting shaft). The output shaft 22 connected to the automatic shifting portion 20 and serving as an output rotary member.

The shifting mechanism 10 may be preferably applied to, for instance, an FR (front-engine and reverse-drive) type vehicle and disposed between an engine 8 and a pair of drive wheels 34. The engine 8 includes an internal combustion engine such as a gasoline engine or a diesel engine or the like and serves as a drive-power source, which is directly connected to the input shaft 12 in series or indirectly through the pulsation absorbing damper (vibration damping device), not shown. This allows a vehicle drive force to be transferred from the engine 8 to the pair of drive wheels 34 in sequence through a differential gear device 32 (final speed reduction gear) (see FIG. 7) and a pair of drive axles.

With the shifting mechanism 10 of the present embodiment, the differential portion 11 is provided in a succeeding stage of the engine 8, that is downstream the engine 8 in the drive power transmitting direction. In addition, the shifting mechanism 10 includes upper and lower halves formed in a symmetric relation with each other along a central axis, and therefore the lower half is omitted from the skeleton diagram of FIG. 1. This similarly applies to the other embodiments of the invention described below.

The differential portion 11 includes a first electric motor M1, a power distributing mechanism 16 in the form of a mechanical mechanism serving as a differential mechanism through which an engine output, applied to the input shaft 14, is mechanically distributed to the first electric motor M1 and the power transmitting member 18, and a second electric motor M2 operatively connected to the power transmitting member 18 for unitary rotation therewith.

In the illustrated embodiment, both the first and second electric motors M1 and M2 are comprised of so-called motor/generators, respectively, each of which has even a function to generate electric power. The first electric motor M1 has at least a generator (electric power generation) function. The second electric motor M2 has at least a function as a motor (electric motor) to act as a running drive-power source to output a vehicle drive force. Here, the differential portion 11 corresponds to the electrically controlled differential portion of the present invention and the power transmitting member 18 corresponds to the output shaft of the differential mechanism.

The power distributing mechanism 16 is mainly comprised of a first single-pinion type planetary gear set 24 having a given gear ratio ρ1 in the order of, for instance, approximately "0.418". The first single-pinion type planetary gear set 24 includes rotary elements (hereinafter referred to as "elements") such as a sun gear S1, first planet gears P1, a first carrier CA1 rotatably supporting the planetary gears such that each of the first planet gears P1 is rotatable about its axis while performing an orbital motion, and a first ring gear R1 in meshing engagement with the first sun gear S1 via the first planet gears P1. Assume that the first sun gear S1 has a gear teeth of ZS1 and the first ring gear R1 has a gear teeth of ZR1, the gear ratio ρ1 is expressed as ZS1/ZR1.

With the power distributing mechanism 16, the first carrier CA1 is connected to the input shaft 14, i.e., the engine 8, the first sun gear S1 connected to the first electric motor M1, and the first ring gear R1 connected to the power transmitting member 18. With the power distributing mechanism 16 of such a structure, the first planetary gear set 24 has the three elements, i.e., the first sun gear S1, the first planetary gear P1, the first carrier CA1 and the first ring gear R1 arranged to rotate relative to each other to be operative for initiating a differential action, i.e., in a differential state under which the differential action is initiated. This allows the output of the engine 8 to be distributed to the first electric motor M1 and the power transmitting mechanism 18. A part of the distributed engine output drives the first electric motor M1 to generate electric energy, which is stored in part in a battery, and used in another part to rotatably drive the second electric motor M2.

Thus, the differential portion 11 (power distributing mechanism 16) is caused to function as an electrically operated differential device such that, for instance, the differential portion 11 is placed in a so-called continuously variable shifting state (electrically established CVT state) to rotate the power transmitting member 18 at a continuously varying rate regardless of the engine 8 operating at a given rotation speed. That is, the differential portion 11 functions as an electrically controlled continuously variable transmission to provide a speed ratio γ0 (representing rotation speed $N_{IN}$ of the input shaft 14/rotation speed $N_{18}$ of the power transmitting member 18) that is continuously variable from a minimal value γ0min to a maximal value γ0max.

The automatic shifting portion 20, corresponding to the mechanical type power transmitting portion of the present invention and including a single-pinion type second planetary gear set 26, a single-pinion type third planetary gear set 28 and a single-pinion type fourth planetary gear set 30, is of a planetary gear type multiple-step transmission that functions as a step-variable type automatic transmission. The second planetary gear set 26 has a second sun gear S2, second planet gears P2, a second carrier CA2 supporting the second planetary gear P2 such that each of the second planet gears P2 is rotatable about its axis and about the axis of the second sun gear S2, and a second ring gear R2 meshing with the second sun gear S2 through the second planet gears P2. For example, the second planetary gear set 26 has a given gear ratio ρ2 of about "0.562".

The third planetary gear set 28 has a third sun gear S3, a third planet gears P3, a third carrier CA3 supporting the third planet gears P3 such that each of the third planet gears P3 is rotatable about its axis and about the axis of the third sun gear S3, and a third ring gear R3 meshing with the third sun gear S3 through the third planet gears P3. For example, the third planetary gear set 28 has a given gear ratio ρ3 of about "0.425".

The fourth planetary gear set 30 has a fourth sun gear S4, fourth planet gears P4; a fourth carrier CA4 supporting the fourth planet gears P4 such that each of the fourth planet gear P4 is rotatable about its axis and about the axis of the fourth sun gear S4, and a fourth ring gear R4 meshing with the fourth sun gear S4 through the fourth planet gears P4. For example, the fourth planetary gear set 30 has a given gear ratio ρ4 of, for instance, about "0.421". Suppose the second sun gear S2, second ring gear R2, third sun gear S3, third ring gear R3, fourth sun gear S4 and fourth ring gear R4 have the numbers of gear teeth represented by ZS2, ZR2, ZS3, ZR3, ZS4 and ZR4, respectively, the gear ratios ρ2, ρ3 and ρ4 are expressed by ZS2/ZR2, ZS3/ZR3 and ZS4/ZR4, respectively.

In the automatic shifting portion 20, the second and third sun gears S2, S3 are integrally connected to each other to be selectively connected to the power transmitting member 18 through a second clutch C2 and selectively connected to the casing 12 through a first brake B1. A second carrier CA2 is selectively connected to the casing 12 through a second brake B2 and the fourth ring gear R4 is selectively connected to the casing 12 through a third brake B3. The second ring gear R2, third carrier CA3 and fourth carrier CA4 are integrally connected to each other and connected to the output shaft 22. The third ring gear R3 and fourth sun gear S4 are integrally connected to each other and selectively connected to the power transmitting member 18 through the first clutch C1. Also, the automatic shifting portion 20 of the present embodiment corresponds to the mechanical type power transmitting portion of the present invention.

Thus, the automatic shifting portion 20 and the differential portion 11 (power transmitting member 18) are selectively connected to each other through the first clutch C1 or the second clutch C2, which is provided to establish each gear position (shift gear position) in the automatic shifting portion 20. In other words, the first and second clutches C1, C2 function as coupling devices operable to place the power transmitting path between the power transmitting member 18 and the automatic shifting portion 20, that is, the power transmitting path between the differential portion 11 (power transmitting member 18) and the drive wheels 34, selectively in one of a power transmitting state in which the vehicle drive force can be transmitted through the power transmitting path, and the power cut-off state in which the vehicle drive force cannot be transmitted through the power transmitting path.

That is, with at least one of the first and second clutches C1 and C2 engaged, the power transmitting path is placed in the power transmitting state. In contrast, uncoupling or disengaging both the first and second clutches C1 and C2 places the power transmitting path in the power cut-off state.

With the automatic shifting portion 20, uncoupling an on-uncoupling side coupling element while coupling an on-coupling side coupling element allows a so-called "clutch-to-clutch" shifting action to be executed for selectively establishing one of the gear positions. This allows a speed ratio γ (representing a ratio of the rotation speed $N_{18}$ of the power transmitting member 18 to the rotation speed $N_{OUT}$ of the output shaft 22) to be obtained in a nearly equal ratio or geometrically for each gear position.

As indicated in the engagement operation table shown in FIG. 2, for instance, engaging first clutch C1 and third brake B3 allows a 1st-speed gear position to be established with a speed ratio γ1 of approximately, for instance, "3.357". Coupling the first clutch C1 and second brake B2 allows a 2nd-speed gear position to be established with a speed ratio γ2 of approximately, for instance, "2.180" that is less than a value of the gear ratio of the 1st-speed gear position. With the first clutch C1 and first brake B1 engaged, a 3rd-speed gear position is established with a speed ratio γ3 of, for instance, approximately "1.424" that is less than a value of the gear ratio of the 2nd-gear position.

Coupling the first and second clutches C1 and C2 allows a 4th-speed gear position to be established with a speed ratio γ4 of, for instance, approximately "1.000" that is less than a value of the gear ratio of the 3rd-gear position. Coupling the second clutch C2 and third brake B3 allows a reverse running gear position (reverse-drive shift position) to be established with a speed ratio γR of, for instance, approximately "3.209" that is intermediate in value between those of the 1st-speed and 2nd-speed gear positions.

Disengaging first and second clutches C1, C2 and first to third brakes B1 to B3 results in a consequence of a neutral state "N" (However, disengaging the first and second clutches C1 and C2 allows the power transmitting state of the automatic shifting portion 20 to be placed in the power transmitting state. Therefore, disengaging at least the first and second clutches C1 and C2 results in the neutral "N" state).

The first and second clutches C1 and C2 and first to third brakes B1 to B3 (hereinafter collectively referred to as a "clutch C" and "brake B", unless otherwise specified) are comprised of hydraulically operated frictional coupling elements serving as coupling elements that are often used in a vehicular automatic transmission portion of the related art. Each of these frictional coupling elements may include a wet-type multiple-disc clutch, having a plurality of mutually overlapping friction plates adapted to be pressurized against each other by a hydraulic actuator, and a band brake including a rotary drum having an outer circumferential surface on which one band or two bands are wound with terminal ends being adapted to be tightened by a hydraulic actuator. Thus, each of the coupling elements serves to selectively couple the associated component parts between which such each coupling element is interposed.

With the shifting mechanism 10 of such a structure mentioned above, the differential portion 11 serving as the continuously variable transmission, and the automatic shifting portion 20 constitute a continuously variable transmission as a whole. Further, controlling the differential portion 11 so as to provide a fixed speed ratio enables the differential portion 11 and automatic shifting portion 20 to structure a status equivalent to a step-variable transmission.

More particularly, the differential portion 11 functions as the continuously variable transmission and the automatic shifting portion 20 connected to the differential portion 11 in series functions as the step-variable transmission, thereby continuously varying a rotation speed (hereinafter referred to as an "input rotation speed of the automatic shifting portion 20"), i.e., a rotation speed of the power transmitting member 18 (hereinafter referred to as a "transmitting-member rotation speed $N_{18}$") input to the automatic shifting portion 20 for at least one gear position "M". This enables the gear position "M" to have a continuously variable range in speed ratio.

Accordingly, the shifting mechanism 10 provides an overall speed ratio γT (representing a ratio of the rotation speed $N_{IN}$ of the input shaft 14 to the rotation speed $N_{OUT}$ of the output shaft 22) in a continuously variable range. Thus, the shifting mechanism 10 can establish the continuously variable transmission. The overall speed ratio γT of the shifting mechanism 10 is a total speed ratio γT of the automatic shifting portion 20 as a whole that is established depending the speed ratio γ of the differential portion 11 and the speed ratio γ of the automatic shifting portion 20.

For the respective gear positions such as, for instance, the 1st-speed to 4th-speed gear positions of the automatic shifting portion 20 and reverse running gear position as indicated in the engagement operation table shown in FIG. 2, the power-transmitting-member rotation speed $N_{18}$ is infinitely and continuously variable such that each gear position is obtained in an infinitely variable speed range. Accordingly, a speed ratio between the adjacent gear positions becomes infinitely and continuously variable, enabling the shifting mechanism 10 as a whole to obtain the total speed ratio γT in an infinitely variable range.

With the differential portion 11 controlled with the fixed speed ratio and the clutch C and brake B selectively engaged, either one of the 1st-speed to 4th-speed gear positions or the reverse running gear position (reverse-drive shift position) are selectively established. This allows the shifting mechanism 10 to have the overall speed ratio γT in a nearly equal ratio for each of the gear positions. Therefore, the shifting mechanism 10 can establish a status equivalent to the step-variable transmission.

If, for instance, the differential portion 11 is controlled so as to provide the speed ratio γ0 fixed at a value of "1", the shifting mechanism 10 provides the total speed ratio γT for each gear position of the 1st-speed to 4th-speed gear positions and reverse running gear position of the automatic shifting portion 20 as indicated by the engagement operation table shown in FIG. 2. Further, if the automatic shifting portion 20 is controlled under the 4th-speed gear position so as to cause the differential portion 11 to have a speed ratio γ0 fixed at a value of approximately, for instance, "0.7" less than a value of "1", the automatic shifting portion 20 has the total speed ratio γT of approximately, for instance, "0.7" that is less than a value of the 4th-speed gear position.

FIG. 3 is a collinear chart for the shifting mechanism 10, including the differential portion 11 and the automatic shifting portion 20, wherein the relative motion relationships among the rotation speeds of the various rotary elements in different coupling states for each gear position can be plotted on straight lines. This collinear chart takes the form of a two-dimensional coordinate system having the abscissa axis plotted with the gear ratios ρ of the planetary gear sets 24, 26, 28 and 30 and the ordinate axis plotted with the mutually relative rotating speeds of the rotary elements. A transverse line X1 indicates a rotation speed laying at a zeroed level; a transverse line X2 indicates a rotation speed of "1.0", that is, a rotating speed $N_E$ of the engine 8 connected to the input shaft 14; and a transverse line XG indicates a rotation speed of the power transmitting member 18.

Starting from the left in sequence, three vertical lines Y1 to Y3, associated with the three elements of the power distributing mechanism 16 forming the differential portion 11, represent the mutually relative rotating speeds of the first sun gear S1 corresponding to a second rotary element (second element) RE2, the first carrier CA1 corresponding to a first rotary element (first element) RE1, and the first ring gear R1 corresponding to a third rotary element (third element) RE3, respectively. A distance between the adjacent vertical lines is determined based on the gear ratio ρ1 of the first planetary gear set 24.

Starting from the left in sequence, further, five vertical lines Y4 to Y8 for the automatic shifting portion 20 represent the mutually relative rotating speeds of: the second and third sun gears S2, S3, corresponding to a fourth rotary element (fourth element) RE4 and connected to each other; the second carrier CA2 corresponding to a fifth rotary element (fifth element) RE5; the fourth ring gear R4*a* corresponding to a sixth rotary element (sixth element) RE6; the second ring gear R2, third carrier CA3 and fourth carrier CA4 corresponding to a seventh rotary element (seventh element) RE7 and connected to each other; and the third ring gear R3 and fourth sun gear S4 corresponding to an eighth rotary element (eighth element) RE8, respectively, and connected to each other. Each distance between the adjacent vertical lines is determined based on the gear ratios ρ2, ρ3 and ρ4 of the second, third and fourth planetary gear sets 26, 28 and 30.

In the relationship among the vertical lines on the collinear chart, if a space between the sun gear and carrier is set to a distance corresponding to a value of "1", then, a space between the carrier and ring gear lies at a distance corresponding to the gear ratio ρ of the planetary gear set. That is, for the differential portion 11, a space between the vertical lines Y1 and Y2 is set to a distance corresponding to a value of "1" and a space between the vertical lines Y2 and Y3 is set to a distance corresponding to the gear ratio ρ1. For the automatic shifting portion 20, further, a space between the sun gear and carrier is set to a distance corresponding to a value of "1" for each of the second, third and fourth planetary gear sets 26, 28, 30 with the space between the carrier and ring gear being set to the distance corresponding to the gear ratio ρ1.

To describe the shifting mechanism 10 with reference to the collinear chart of FIG. 3, with the power distributing mechanism 16 (differential portion 11), the first rotary element RE1 (first carrier CA1) of the first planetary gear set 24 is connected to the input shaft 14, i.e., the engine 8. The second rotary element RE2 is connected to the first electric motor M1. The third rotary element RE3 (first ring gear R1) is connected to the power transmitting member 18 and second electric motor M2. Thus, the shifting mechanism 10 is structured so as to allow the input shaft 14 to transmit (input) a rotary motion to the automatic shifting portion 20 through the power transmitting member 18.

When this takes place, an inclined straight line L0, passing across a point of intersection between the lines Y2 and X2, indicates the relationship between the rotation speeds of the first sun gear S1 and first ring gear R1.

Under a circumstance where, for example, the differential portion 11 is placed in a differential state with the first to third rotary elements RE1 to RE3 enabled to rotate relative to each other while the rotation speed of the first ring gear R1, indicated at an intersecting point between the straight line L0 and vertical line Y3, is bound with the vehicle speed V and remains at a nearly constant level, the operations occur in a manner as described below. That is, as the engine rotation speed $N_E$ is controlled and the rotation speed of the first carrier CA, indicated by an intersecting pint between the straight line L0 and vertical line Y2, is raised or lowered, the rotation speed of the first sun gear S1, indicated by an intersecting point between the straight line L0 and vertical line Y1, i.e., the rotation speed of the first electric motor M1 is raised or lowered.

As the rotation speed of the first electric motor M1 is controlled so as to cause the differential portion 11 to have the speed ratio γ0 fixed at "1", the first sun gear S1 rotates at the same speed as the engine rotation speed $N_E$. This causes the straight line L0 to be aligned with the horizontal line X2 and the first ring gear R1, i.e., the power transmitting member 18, is caused to rotate at the same speed as the engine rotation speed $N_E$.

On the contrary, if the rotation speed of the first electric motor M1 is controlled so as to allow the differential portion 11 to have the speed ratio γ0 of approximately, for instance, "0.7" less than "1", the rotation speed of the first sun gear S1 is zeroed. Therefore, the power-transmitting member rotation speed $N_{18}$ increases to a higher level than the engine rotation speed $N_E$.

With the automatic shifting portion 20, the fourth rotary element RE4 is selectively connected to the power transmitting member 18 via the second clutch C2 and selectively connected to the casing 12 via the first brake B1. The fifth rotary element RE5 is selectively connected to the casing 12 via the second brake B2. The sixth rotary element RE6 is selectively connected to the casing 12 via the third brake B3. The seventh rotary element RE7 is connected to the output shaft 22 and the eighth rotary element RE8 is selectively connected to the power transmitting member 18 via the first clutch C1.

With the automatic shifting portion 20, if the differential portion 11 operates so as to allow the rotation of the power transmitting member 18 (third rotary element RE3), serving as the output rotation member), to be input to the eighth rotary element RE8, the first clutch C1 and third brake B3 are engaged as shown in FIG. 3. This allows the rotation speed of the output shaft 22 for the 1st-speed to be indicated by an intersecting point between the inclined line L1, passing across an intersecting point between the vertical line Y8, indicative of the rotation speed of the eighth rotary element RE8, and the horizontal line XG and an intersecting point between the vertical line Y6, indicative of the rotation speed of the sixth rotary element RE6, and the horizontal line X1, and an intersecting point intersecting the vertical line Y7 indicative of the rotation speed of the seventh rotary element RE connected to the output shaft 22.

Similarly, the rotation speed of the output shaft 22 is indicated for the 2nd-speed gear position as represented by an intersecting point between an inclined straight line L2, determined when the first clutch C1 and second brake B2 are engaged, and the vertical line Y7 indicative of the rotation speed of the seventh rotary element RE7 connected to the output shaft 22. The rotation speed of the output shaft 22 is indicated for the 3rd-speed gear position as represented by an intersecting point between an inclined straight line L3, determined when the first clutch C1 and first brake B1 are engaged, and the vertical line Y7 indicative of the rotation speed of the seventh rotary element RE7 connected to the output shaft 22. The rotation speed of the output shaft 22 is indicated for the 4th-speed gear position as represented by an intersecting point between a horizontal straight line L4, determined with the first clutch C1 and second brake B2 being engaged, and the vertical line Y7 indicative of the rotation speed of the seventh rotary element RE7 connected to the output shaft 22.

Figure 4:
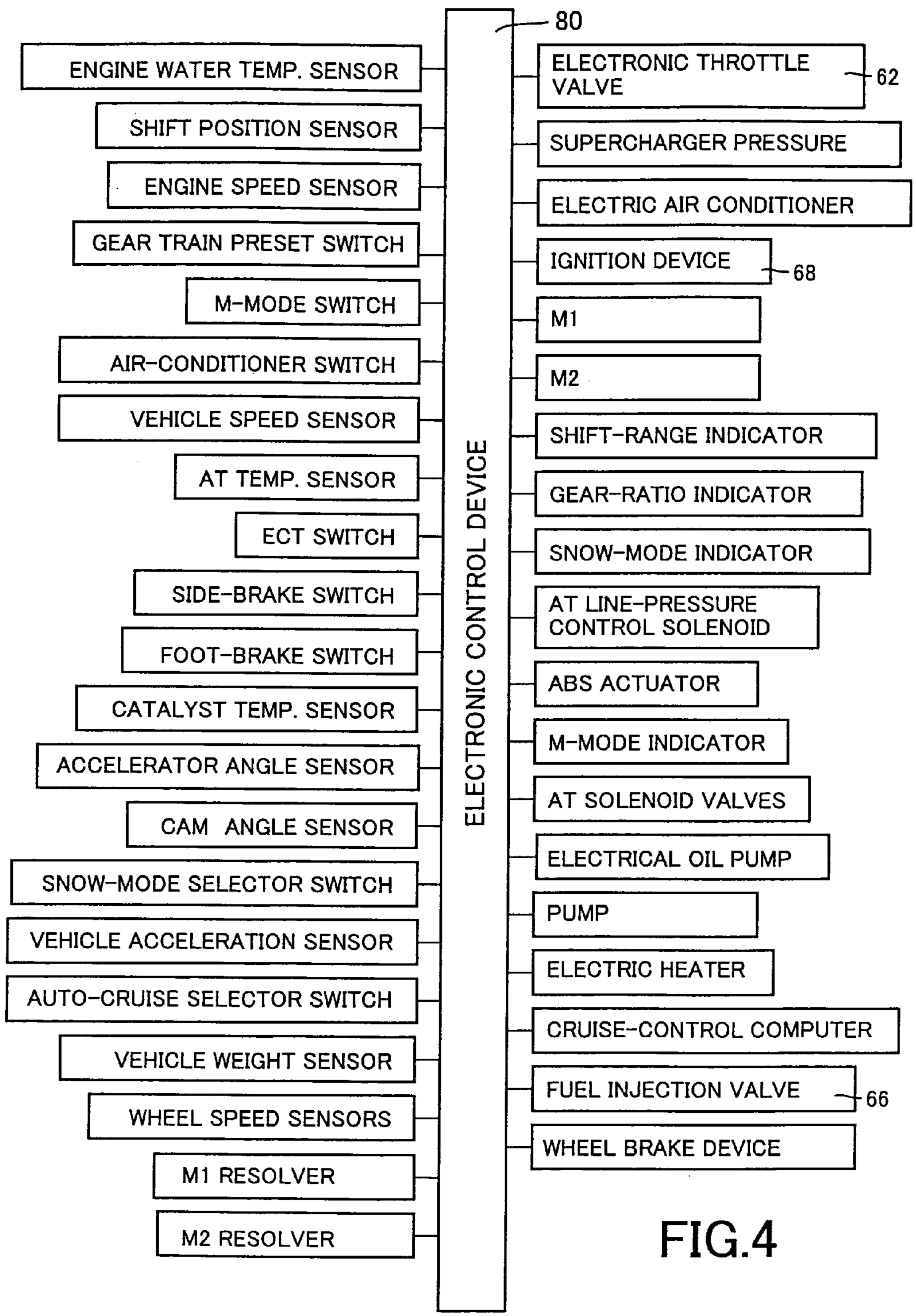
FIG. 4 is a view illustrating an electronic control unit with input and output signals associated therewith which is provided in the drive system shown in FIG. 1.

FIG. 4 shows an electronic control unit 80, operative to control the shifting mechanism 10 of the present invention, which is applied with various input signals and outputs various signals in response thereto. The electronic control unit 80 includes a so-called microcomputer incorporating a CPU, a ROM, a RAM and an input/output interface. The microcomputer processes the signals according to programs stored in the ROM while utilizing a temporary data storage function of the ROM, thereby implementing hybrid drive controls related to the engine 8 and first and second electric motors M1 and M2 while executing drive controls such as shifting controls of the automatic shifting portion 20.

The electronic control unit 80, connected to various sensors and switches as shown in FIG. 4, receives various signals including a signal indicative of an engine coolant temperature $TEMP_W$, a signal indicative of a shift position $P_{SH}$ and a signal indicative of the number of operations initiated on an "M" position of a shift lever 52 (see FIG. 6), a signal indicative of the engine rotation speed $N_E$ representing the rotation speed of the engine 8, a signal indicative of a gear train preset value, a signal commanding an M mode (manual shift running mode), a signal indicative of an air conditioner being turned on, a signal indicative of the vehicle speed V corresponding to the rotation speed (hereinafter referred to as "output shaft rotation speed") $N_{OUT}$ of the output shaft 22, a signal indicative of a temperature $T_{OIL}$ of working oil of the automatic shifting portion 20, a signal indicative of a side brake under operation and a signal indicative of a foot brake under operation, etc.

The various signals further includes a signal indicative of a temperature of a catalyst, a signal indicative of an accelerator opening Acc representing an operating stroke of an accelerator pedal corresponding to an output demanded operation variable intended by a driver, a signal indicative of a cam angle, a signal indicative of a snow mode being set, a signal indicative of a fore and aft acceleration value G of the vehicle, a signal indicative of an auto-cruising running mode, a signal indicative of a weight (vehicle weight) of the vehicle, a signal indicative of a wheel velocity of each drive wheel, a signal indicative of a rotation speed $N_{M1}$ of the first electric motor M1 (hereinafter referred to as "first-motor rotation speed $N_{M1}$) and a rotation direction thereof, a signal indicative of a rotation speed $N_{M2}$ of the second electric motor M2 (hereinafter referred to as "second-motor rotation speed $N_{M2}$) and a rotation direction thereof, and a signal indicative of a state of charge (charged state) SOC of a battery 60 (see FIG. 7), etc.

Meanwhile, the electronic control unit 80 generates various output signals to be applied to an engine output control device 58 (see FIG. 7) for controlling an output of the engine 8. These output signals include, for instance, a drive signal to be applied to a throttle actuator 64 for controlling a throttle valve opening $\theta_{TH}$ of an electronic throttle valve 62 disposed in an intake manifold 60 of the engine 8, a fuel supply quantity signal to be applied to a fuel injecting device 66 for controlling an amount of fuel injected into the intake manifold 60 or cylinders of the engine 8, and an ignition signal to be applied to an ignition device 68 to control the ignition timing of the engine 8.

The output signals further include, for instance, a supercharger pressure regulation signal for regulating a supercharger pressure of the engine 8, an air-conditioner drive signal for actuating an electric air-conditioner, command signals for commanding the operations of the electric motors M1 and M2, a shift-position (manipulated position) display signal for actuating a shift-range indicator and a gear-ratio display signal for displaying the gear ratio, etc.

In addition, the output signals further include a snow mode display signal for providing a display the presence of a now mode, an ABS actuation signal for actuating an ABS actuator to preclude slippages of the drive wheels during a braking phase, an M-mode display signal for displaying the M-mode being selected, valve command signals for actuating electromagnetic valves (linear solenoid valves), incorporated in the hydraulic control unit 70 (see FIGS. 5 and 7) for controlling the hydraulic actuators of the hydraulically operated frictional coupling devices of the differential portion 11 and automatic shifting portion 20, a signal for causing regulator valves (pressure regulator valves), incorporated in the hydraulic control unit 70, to regulate a line pressure $P_L$, a drive command signal for actuating an electrically driven hydraulic pump acting as a hydraulic original-pressure source for the line pressure $P_L$ to be regulated, a signal for driving an electric heater, and a signal applied to a cruise control computer, etc.

Figure 5:
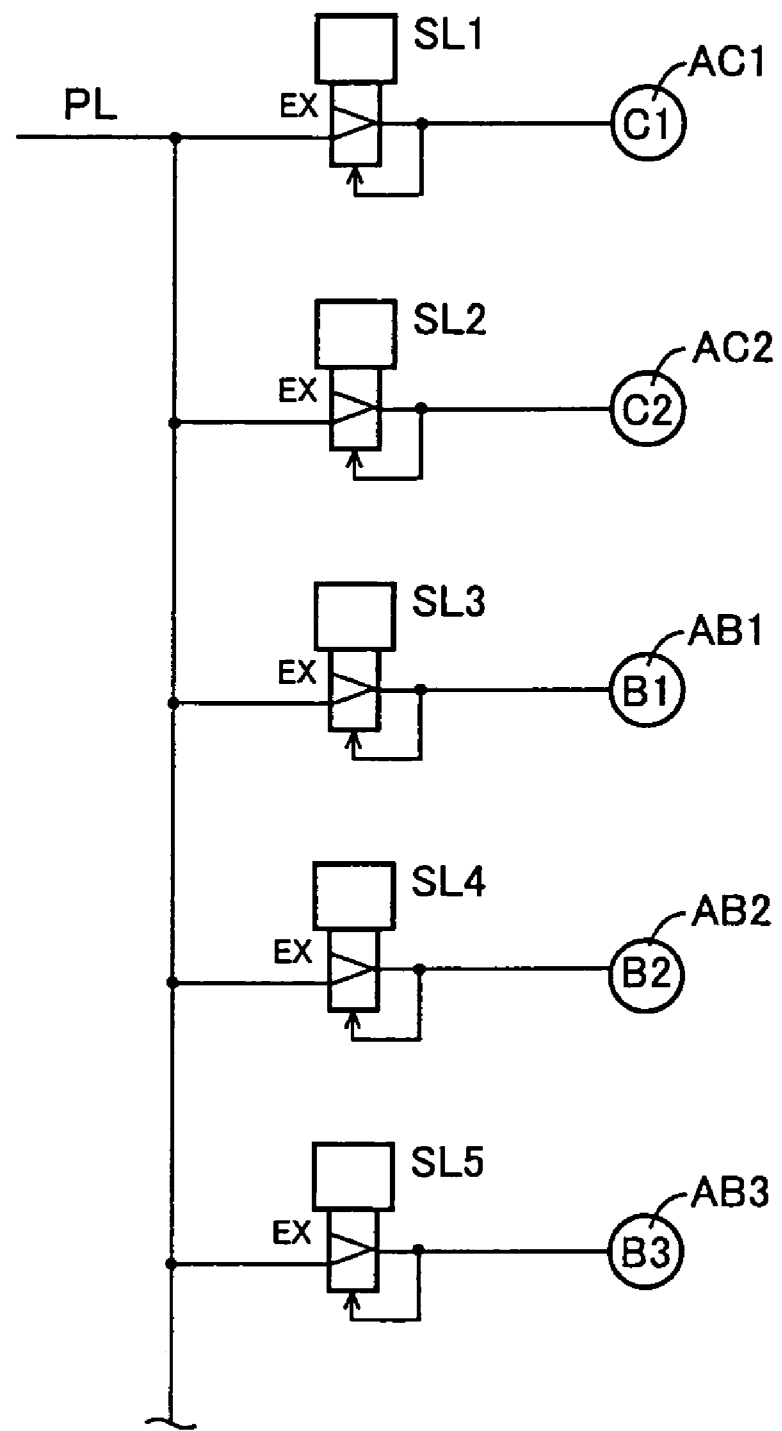
FIG. 5 is a circuit diagram related to linear solenoid valves for controlling operations of various hydraulic actuators of clutch C and brake B of a hydraulic control circuit.

FIG. 5 is a circuit diagram related to linear solenoid valves SL1 to SL5 of the hydraulic control circuit 70 for controlling the operations of respective hydraulic actuators (hydraulic cylinders) AC1 and AC2 and AB1 to AB3 of the clutches C1, C2 and brakes B1 to B3.

In FIG. 5, the line pressure $P_L$ is applied to the respective linear solenoid valves SL1-SL5, connected to hydraulic actuators AC1 and AC2 and AB1 to AB3, respectively. These linear solenoids are controlled in response to command signals delivered from the electronic control unit 80, thereby regulating the line pressure $P_L$ into respective clutch engaging pressures PC1 and PC2 and PB1 to PB3 which in turn are directly supplied to the respective hydraulic actuators AC1 and AC2 and AB1 to AB3. The original hydraulic pressure, generated by the electrical oil pump (not shown) or a mechanical oil pump rotatably driven by the engine 30, is regulated by, for instance, a relief-type pressure regulator valve to adjust the line pressure $P_L$ depending on a load of the engine 8 or the like represented in terms of the accelerator opening or throttle valve opening.

The linear solenoid valves SL1 to SL5, fundamentally formed in identical structures, are independently energized or de-energized with the electronic control unit 80. These allow the hydraulic actuators AC1 and AC2 and AB1 to AB3 to independently and controllably regulate respective hydraulic pressures, thereby controlling the clutch engaging pressures PC1 and PC2 and PB1 to PB3 for the clutches C1 and C2 and brakes B1 to B3. With the automatic shifting portion 20, predetermined coupling devices are engaged in a manner as indicated on, for instance, the engagement operation table shown in FIG. 2, thereby establishing various gear positions. In addition, during the shifting control of the automatic shifting portion 20, the so-called clutch-to-clutch shifting is executed to simultaneously control the coupling or uncoupling states of the clutches C and brakes B related to the shifting operations.

Figure 6:
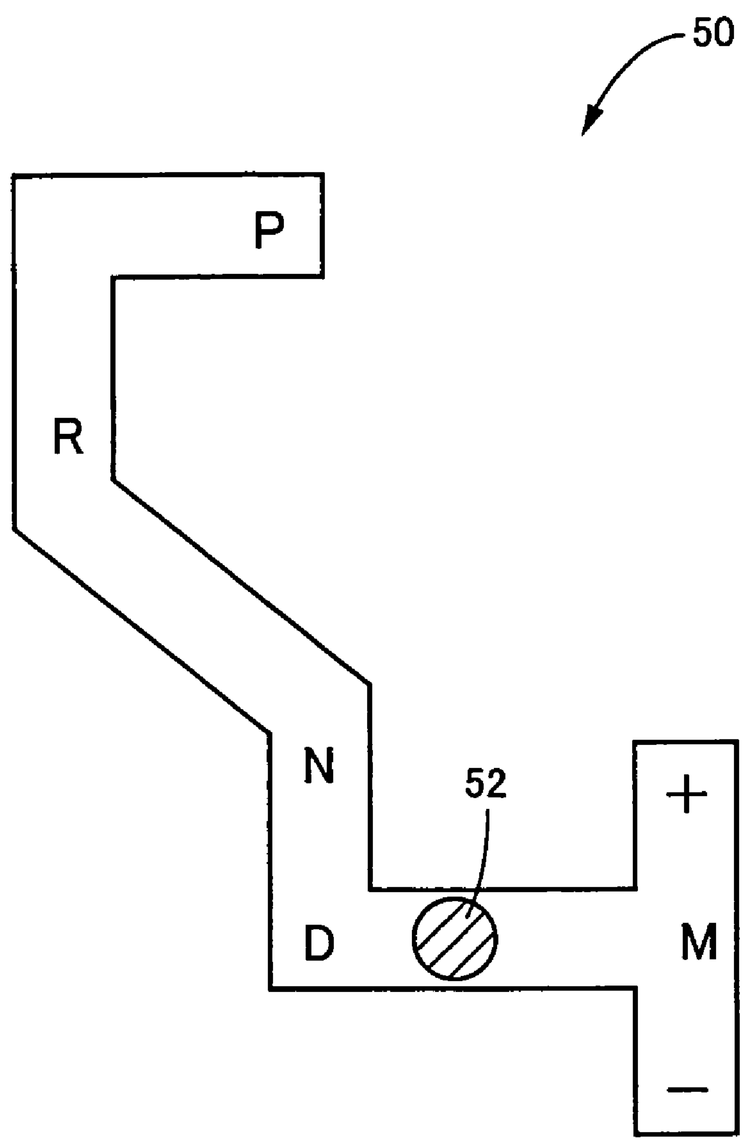
FIG. 6 is a view showing one example of a shift operation device having a shift lever operative to select one of a plurality of shift positions of multiple kinds.

FIG. 6 is a view showing one example of a shift operation device 50 serving as a changeover device operative to select one of shift positions $P_{SH}$ multiple kinds on manual operation. The shift operation device 50 is mounted in, for instance, an area lateral to a driver's seat and includes a shift lever 52 to be manipulated for selecting one of the multiple shift positions $P_{SH}$.

The shift lever 52 is structured to be manually selected to a parking position "P (Parking)", a reverse drive position "R (Reverse)" for a reverse-drive mode to be initiated, a neutral position "N (Neutral)" for the power transmitting path inside the shifting mechanism 10 to be shut off under the neutral state, a forward-drive automatic-shift drive position "D (Drive)" or a forward-drive manual-shift position "M (Manual)".

The "P" position represents a position in which an internal path of the shifting mechanism 10, i.e., the power transmitting path inside the automatic shifting portion 20 is shut off in a neutrality, i.e., in a neutral condition, with the output shaft 22 of the automatic shifting portion 20 remained in a locked state. The "D" position represents a position in which an automatic shift mode is established for executing an automatic shift control within a varying range of a shiftable total speed ratio γT of the shifting mechanism 10 resulting from various gear positions with the automatic shift control being performed in a continuously variable speed ratio width of the differential portion 11 and a range of the 1st-speed to the 4th-speed gear positions of the automatic shifting portion 20. The "M" position represents a position in which a manual-shift forward-drive mode (manual mode) is established for setting a so-called shift range to limit a shifting gear position on a high speed range during the operation of the automatic shifting portion 20 under the automatic shift control.

In conjunction of the operation of the shift lever 52 in various shift positions $P_{SH}$, the hydraulic control circuit 70 is electrically switched so as to establish, for instance, the reverse running gear position "R", the neutral position "N" and the various gear positions in the forward running gear position "D" as indicated by the engagement operation table shown in FIG. 2.

Among the various positions represented by the "P" to "M" positions, the "P" and "N" positions represent non-drive positions, selected when no vehicle is intended to run. That is, these are the non-drive positions for selecting the vehicle to be switched to the power cut-off state under which both the first and second clutches C1 and C2 are disengaged, as indicated in the engagement operation table shown in FIG. 2, to interrupt the power transmitting path in the automatic shifting portion 20.

The "R", "D" and "M" positions represent drive positions selected when the vehicle is intended to run. That is, these are drive positions for selecting the power transmitting path to be switched to the power transmitting state, upon effectuations of the first and/or second clutches C1 and C2, to enable the vehicle to be driven with the power transmitting path of the automatic shifting portion 20 being established under which at least one of the first and second clutches C1 and C2 is engaged as indicated in, for instance, the engagement operation table shown in FIG. 2.

More particularly, if the shift lever 52 is manually shifted from the "P" position or "N" position to the "R" position, the second clutch C2 is engaged causing the power transmitting path of the automatic shifting portion 20 to be switched from the power cut-off state to the power transmitting state. If the shift lever 52 is manually shifted from the "N" position to the "D" position, at least the first clutch C1 is engaged to switch the power transmitting path of the automatic shifting portion 20 from the power cut-off state to the power transmitting state.

With the shift lever 52 manually shifted from the "R" position to the "P" or "N" position, the second clutch C2 is disengaged to switch the power transmitting path of the automatic shifting portion 20 from the power transmitting state to the power cut-off state. If the shift lever 52 is manually shifted from the "D" position to the "N" position, both the first and second clutches C1, C2 are disengaged to switch the power transmitting path of the automatic shifting portion 20 from the power transmitting state to the power cut-off state.

Figure 7:
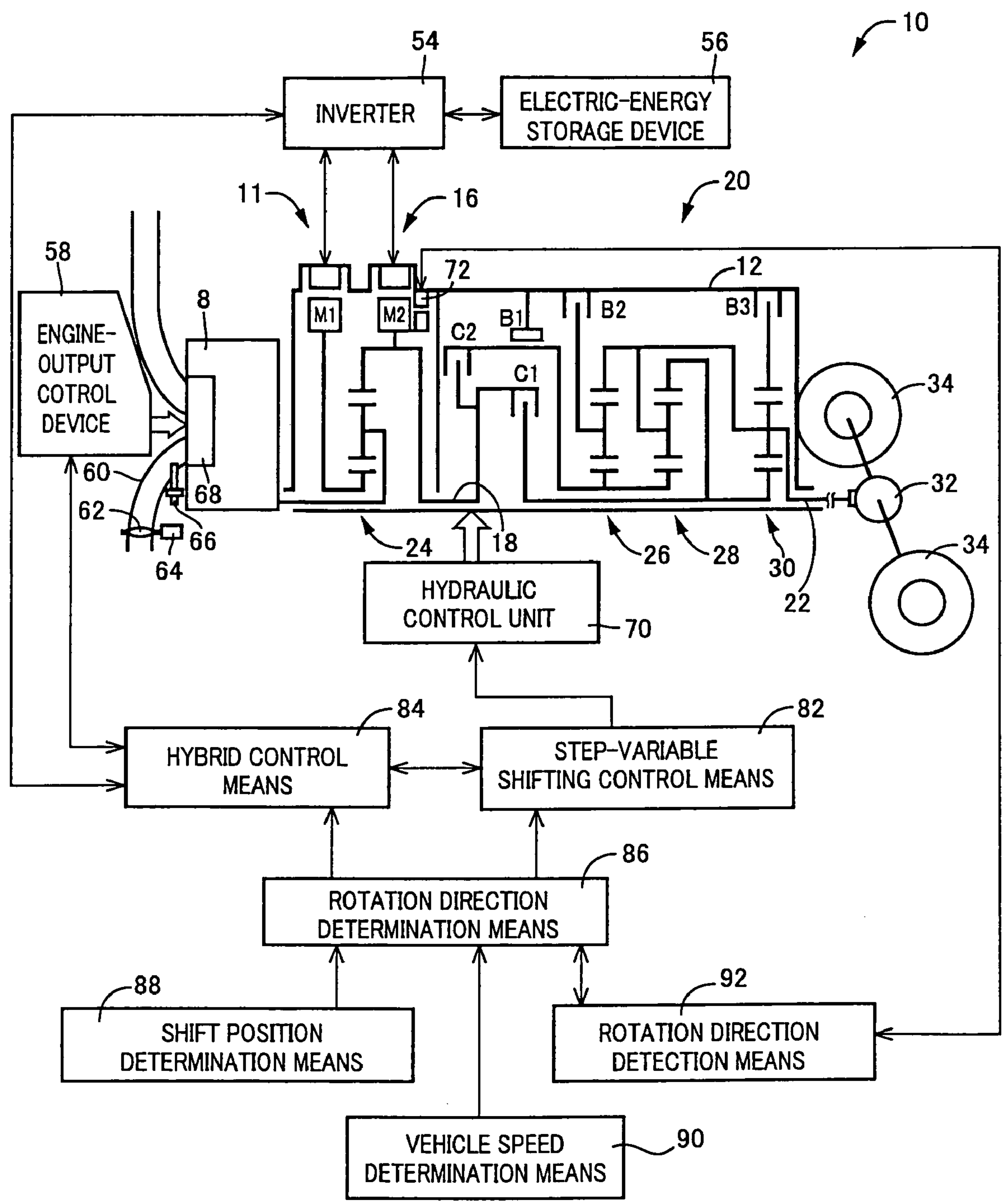
FIG. 7 is a functional block diagram illustrating major control functions of the electronic control unit of FIG. 4.
Figure 8:
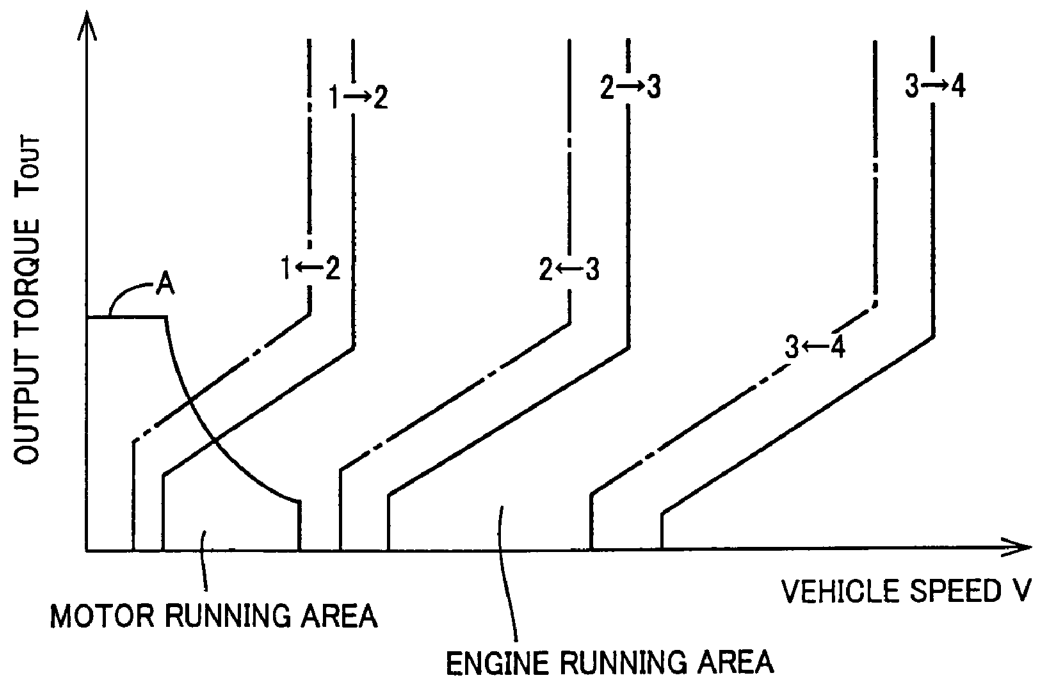
FIG. 8 is a view illustrating one example of a shifting map for use in performing a shifting control of the drive system and one example of drive-power-source map for use in a drive-power-source switching control between an engine running mode and a motor running mode with those maps being related to each other.

FIG. 7 is a functional block diagram illustrating major control functions to be executed by the electronic control unit 80. In FIG. 7, step-variable shift control means 82 determines whether to execute a shifting, i.e., a gear position to be shifted in the automatic shifting portion 20 and executes the automatic shift control for the automatic shifting portion 20 so as to establish a gear position resulting from the determination. The gear position is determined based on a vehicle condition, represented by an actual vehicle speed V and output, torque $T_{OUT}$ of the automatic shifting portion 20, by referring to the relationship (shifting lines and shifting map) with upshift lines (in solid lines) and downshift lines (in single dot lines) that are preliminarily stored in terms of parameters such as the vehicle speed V and output torque $T_{OUT}$ of the automatic shifting portion 20 as shown in FIG. 8.

When this takes place, the step-variable shift control means 82 outputs commands (a shift output command and a hydraulic pressure command) to the hydraulic control circuit 70 for engaging and/or disengaging the hydraulically operated frictional coupling devices, involved in the shifting of the automatic shifting portion 20, so as to establish the gear positions in accordance with, for instance, the engagement operation table shown in FIG. 2. In particular, these commands on the coupling and/or uncoupling are output for effectuating the clutch-to-clutch shifting upon disengaging on-uncoupling side coupling devices, involved in the shifting of the automatic shifting portion 20, and engaging on-coupling coupling devices.

Upon receipt of such commands, the hydraulic control circuit 70 actuates, for instance, the linear solenoid valves SL of the hydraulic control circuit 70, thereby actuating the hydraulic actuators of the hydraulically operated frictional coupling elements involved in the shifting. This is because the on-uncoupling side coupling elements are disengaged while engaging on-coupling side coupling elements for thereby executing the shifting of the automatic shifting portion 20.

Hybrid control means 84 renders the engine 8 operative in an operating range at a high efficiency. In addition, the hybrid control means 84 allows the drive forces of the engine 8 and second electric motor M2 to be optimally distributed while causing a reacting force of the first electric motor M1 to optimally vary during the operation thereof to generate electric power, thereby controlling a speed ratio $\gamma 0$ of the differential portion 11 serving as the electrically controlled continuously variable transmission.

At a vehicle speed V during the running of the vehicle in one occasion, for instance, the hybrid control means 84 calculates a target (demanded) output for the vehicle based on the accelerator opening Acc, representing the output demanded operation variable intended by the driver, and the vehicle speed, thereby calculating a demanded total target output based on the target output of the vehicle and a battery charge demanded value. In this moment, a target engine output is calculated in consideration of a loss in power transmission, loads of auxiliary units, assist torque of the second electric motor M2 or the like so as to obtain the total target output. Then, the hybrid control means 84 controls the engine 8, while controlling a rate of electric power to be generated by the first electric motor M1. This allows the engine rotation speed $N_E$ and engine torque $T_E$ to be obtained such that the target engine output is obtained.

The hybrid control means 84 executes such controls in consideration of, for instance, the gear position of the automatic shifting portion 20 with a view to increasing a dynamic performance and improving fuel consumption. During such hybrid controls, the differential portion 11 is caused to function as the electrically controlled continuously variable transmission. This is because the engine rotation speed $N_E$, determined for the engine 8 to operate in the operating range at a high efficiency, is made to match the rotation speed of the power transmitting member 18 determined with the vehicle speed V and the gear position of the automatic shifting portion 20.

Figure 9:
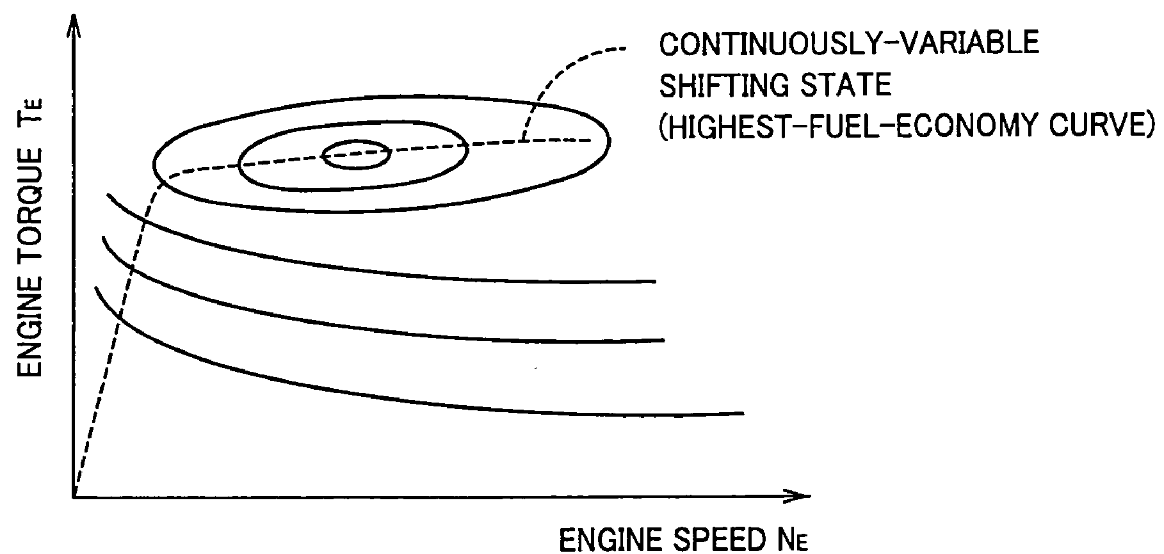
FIG. 9 is a view illustrating one example showing a fuel consumption map with a broken line representing an optimum fuel consumption curve of an engine.

FIG. 9 shows an optimal fuel consumption curve (fuel consumption map and the relationship) of the engine 8, preliminarily obtained and prestored on experiments to provide a compromise between driveability and fuel consumption during the running of the vehicle under a continuously variable shifting mode, which is plotted on a two-dimensional coordinate established with the engine rotation speed $N_E$ and output torque (engine torque) $T_E$ of the engine 8. The hybrid control means 84 determines a target value of the total speed ratio $\gamma T$ of the shifting mechanism 10 such that the engine 8 is caused to operate along the optimal fuel consumption curve (fuel consumption map and the relationship) of the engine 8 shown by a broken line in FIG. 9. This target value is determined to achieve engine torque $T_E$ and engine rotation speed $N_E$ to provide an engine output at a rate needed for satisfying, for instance, the target outputs (a total target output and demanded drive force). To obtain such a target value, the speed ratio $\gamma 0$ of the differential portion 11 is controlled in consideration of the gear position in the automatic shifting portion 20, thereby controlling the total speed ratio $\gamma T$ within a shiftable varying range.

When this takes place, the hybrid control means 84 allows electric energy, generated by the first electric motor M1, to be supplied through an inverter 54 to a battery 56 and the second electric motor M2. Thus, a major part of the drive force of the engine 8 is mechanically transferred to the power transmitting member 18. However, a remaining part of the drive force of the engine 8 is consumed with the first electric motor M1 to generate electric power for conversion into electric energy. Resulting electric energy is supplied through the inverter 54 into the second electric motor M2, which is consequently driven to generate a drive force that is transmitted to the power transmitting member 18. Thus, an electric path is established by equipment, involved in operations including the step of generating electric power to the step of causing the second electric motor M2 to consume resultant electric energy, in which the part of the drive force of the engine 8 is converted into electric energy which in turn is converted into mechanical energy.

The hybrid control means 84 allows the differential portion 11 to perform an electrically controlled CVT function to control, for instance, the first-motor rotation speed $N_{M1}$ and/or second-motor rotation speed $N_{M2}$ regardless of the vehicle remaining under a halted condition or running condition. This causes the engine rotation speed $N_E$ to be maintained at a nearly fixed level or to be controlled at an arbitrary rotation speed. In other words, the hybrid control means 84 maintains the engine rotation speed $N_E$ at the nearly fixed level while rotatably controlling the first-motor rotation speed $N_{M1}$ and/or second-motor rotation speed $N_{M2}$ at an arbitrary rotation speed.

For instance, as will be apparent from the collinear chart shown in FIG. 3, when raising the engine rotation speed $N_E$ during the running of the vehicle, the hybrid control means 84 maintains the second-motor rotation speed $N_{M2}$, bound with the vehicle speed V (represented by wheel velocities of the drive wheels 34), at a nearly fixed level first-motor rotation speed $N_{M1}$ while raising the first-motor rotation speed $N_{M1}$; Further, in order for the engine rotation speed $N_E$ to be maintained at a nearly fixed level during the shifting of the automatic shifting portion 20, the hybrid control means 84 varies the first-motor rotation speed $N_{M1}$ in a direction opposite to that in which the second-motor rotation speed $N_{M2}$ varies with the shifting of the automatic shifting portion 20 while maintaining the engine rotation speed $N_E$ at the nearly fixed level.

The hybrid control means 84 functionally includes engine output control means for executing the output control of the engine 8 so as to cause the same to generate a demanded engine output. That is, the hybrid control means 84 causes various commands, described below, to be output to the engine output control means 58. In particular, these commands include a command for permitting the throttle actuator 64 to controllably open or close the electronic throttle valve 62 for performing a throttle control, a command for permitting a fuel injection device 66 to control a fuel injection quantity and fuel injection timing for a fuel injection control, and a command for permitting an ignition device 68, such as an igniter or the like, to control an ignition timing for an ignition timing control.

The hybrid control means 84 executes the throttle control so as to drive the throttle actuator 60 in response to, for instance, the accelerator opening Acc by basically referring to the prestored relationship (not shown) such that the greater the accelerator opening Acc, the larger will be the throttle valve opening $\theta_{TH}$. Upon receipt of the commands from the hybrid control means 84, the engine output control device 58 allows the throttle actuator 64 to controllably open or close the electronic throttle valve 62 for throttle control. In addition to such a control, the engine output control device 58 allows the fuel injection device 66 to control the fuel injection for the fuel injection control while permitting the ignition device 68, such as the igniter or the like, to control the ignition timing for the ignition timing control.

The hybrid control means 84 renders the differential portion 11 operative to perform the electrically controlled CVT function (differential action) to achieve the motor running mode regardless of the engine 8 remaining under the halted condition or idling condition. For instance, the hybrid control means 84 executes the motor-drive running mode at a relatively low output torque $T_{OUT}$ range, regarded to be generally lower in engine efficiency than that of the engine operating in a high output torque range, i.e., a low engine torque Te range or a relatively low vehicle speed range of the vehicle speed V, i.e., a low load range.

During the motor-drive running mode, the hybrid control means 84 allows the differential portion 11 to perform the electrically controlled CVT function (differential action) to maintain the engine speed $N_E$ at a zeroed or nearly zeroed level depending on needs. This is because such a control minimizes a drag of the engine 8 under the halted condition for thereby improving fuel consumption. In order to control the first-electric-motor rotational speed $N_{M1}$ in a negative rotational speed, for instance, the first electric motor M1 is rendered inoperative to be placed in an unloaded condition for idling.

Even if the engine-drive running region is present, the hybrid control means 84 allows the first electric motor M1 and/or the battery device 56 to supply electric energy to the second electric motor M2 using the electrical path mentioned above. This drives the second electric motor M2 to apply torque to the drive wheels 34, making it possible to provide a so-called torque-assist for assisting drive power of the engine 8.

The hybrid control means 84 renders the first electric motor M1 inoperative under the unloaded condition to freely rotate in the idling state. This makes it possible to cause the differential portion 11 to interrupt a torque transfer; i.e., the differential portion 11 is rendered inoperative with no output being provided under the same state as that in which the power transmitting path is disconnected in the differential portion 11. That is, the hybrid control means 84 places the first electric motor M1 in the unloaded condition, making it possible to place the differential portion 11 in a neutral condition (neutral state) in which the power transmitting path is electrically disconnected.

With the shifting mechanism 10 of the illustrated embodiment, the rotation direction of the output shaft 22 of the automatic shifting portion 20, i.e., a traveling direction of a vehicle is determined based on a rotational direction signal of the second electric motor M2 detected with a resolver (see FIG. 7) incorporated in the second electric motor M2. The resolver 72, well known in the art, is an angle detection sensor that converts a mechanical angular displacement of a rotary element into an electric signal. Upon detection of such an angular displacement, the rotation direction is detected and the operation is executed to calculate a variation in the angular displacement within a fixed time interval for thereby detection the rotation speed. With such an operation, the second-electric-motor rotational speed $N_{M2}$ of the second electric motor M2, detected by the resolver 72, results in a consequence of including a sign of the rotation speed, i.e., a normal rotation or reverse rotation of the second electric motor M2. This makes it possible to determine the rotation direction of the output shaft 22.

Under a situation where the gear position of the automatic shifting portion 20 is placed in one of the forward running gear positions (1st- to 4th-gear positions), a rotary shaft (rotor) of the second electric motor M2 and output shaft 22 of the automatic shifting portion 20 are brought into an interlocking operation. In particular, the rotary shaft (rotor) of the second electric motor M2 and output shaft 22 rotate in the same direction.

Meanwhile, under a situation where the gear position of the automatic shifting portion 20 is placed in the reverse running gear positions (Rev), the rotary shaft (rotor) of the second electric motor M2 and output shaft 22 of the automatic shifting portion 20 are brought into the interlocking operation. In particular, the rotary shaft (rotor) of the second electric motor M2 and output shaft 22 rotate in the opposite directions. On the ground of such a difference, detecting the rotation direction of the rotor of the second electric motor M2 enables the rotation direction of the output shaft 22 to be discriminated. In addition, as used herein, the term "rotation of the second electric motor M2" substantially refers to the rotation of the second electric motor M2.

Under a situation where the power transmitting path is interrupted between the differential portion 11 and automatic shifting portion 20, i.e., under a neutral condition, the interlocking operation between the second electric motor M2 and output shaft 22 is brought into a disconnected condition. Therefore, it becomes impossible to detect the rotation direction of the second electric motor M2 for thereby determining the rotation direction of the output shaft 22.

To address such an issue, with the illustrated embodiment, rotation direction determination means 86 is arranged to make it possible to determine the rotation direction of the output shaft 22 even under the neutral condition. Shift position determination means 88 determines a current position of the shift lever 52 based on a signal representing the shift position $P_{SH}$ of the shift lever 52 to determine whether or not the current position of the shift lever 52 remains in the "N" position with the power transmitting path of the shifting mechanism 10 being interrupted.

Vehicle speed determination means 90 determines whether or not the calculated vehicle speed V exceeds the given speed V1 in response to the output-shaft speed rotation speed $N_{OUT}$ detected by the rotational speed sensor 74 (see FIG. 1). The given speed V1 is set to a lower value of the order of a nearly zeroed level for blocking the current control from being executed in excess. In addition, the rotational speed sensor 74 is able to detect only the rotation speed in general and impossible to detect the rotation direction.

Rotation direction detection means 92 detects the rotation direction of the second electric motor M2 based on a variation in the angular displacement of the second electric motor M2 detected by the resolver 72. Rotation direction determination means 86 discriminates the rotation direction of the output shaft 22 of the automatic transmission 20 in response to detected results on the engaged coupling element of the automatic transmission 20 and the rotation direction detection means 92 depending on the vehicle condition. Hereunder, description will be made of how the operation is executed to determine the rotation direction of the output shaft 22 of the automatic shifting portion 20 with the power transmitting path being interrupted under the neutral condition.

As the shift position determination means 88 determines that the shift lever 52 is placed in the "N" position and the vehicle speed determination means 90 determines that the vehicle speed exceeds the given speed V1, the rotation direction determination means 86 operates in a manner described below. That is, the rotation direction determination means 86 outputs a command to the step-variable shift control means 82 for engaging the first clutch C1 and third brake B3 corresponding to the given coupling elements in the illustrated embodiment. This causes the second electric motor M2 and output shaft 22 of the automatic shifting portion 20 to be brought into an interlocking operation with the automatic shifting portion 20 placed in the 1st-speed gear position involved in the forward running gear position.

Therefore, the second electric motor M2 and output shaft 22 of the automatic shifting portion 20 are caused to rotate in the same directions. Here, the given coupling elements of the present invention include coupling elements, operative to be engaged when establishing a selected gear position, which correspond to, for instance, the second clutch C2 and third brake B3 as shown in FIG. 2 when establishing the reverse running gear position.

The third brake B3 is a coupling element that is commonly engaged for the 1st-speed and reverse running gear positions. Upon preliminarily engaging third brake B3 during the neutral state, only the first clutch C1 acting as the coupling element for the 1st-speed gear position, or the second clutch C2 acting as the coupling element for the reverse running gear position may suffice to be engaged, when engaging the coupling elements for the 1st-speed gear position or reverse running gear position from the "N" position. In addition, in a case where a one-way clutch is disposed in parallel to the third brake B3 for limiting the rotation of the fourth ring gear R4 in one direction, the engagement of the third brake B3 can be omitted when using such a function to establish the 1st-speed gear position.

Now, description will be made of a situation under which the shift lever 52 is placed in the "N" position. During the motor running mode, a command is output to the hybrid control means 84 for zeroing the second electric motor M2. During the engine running mode, a command is output to the hybrid control means 84 for zeroing reaction torque of the first electric motor M1 and drive force of the second electric motor M2. Under such a condition, the differential portion 11 is controlled in the power cut-off state and the second electric motor M2 is brought into a freely rotating condition (idling state).

With these controls being executed, the second electric motor M2 is caused to rotate depending on the rotation of the output shaft 22, i.e., the rotations of the drive wheels 34 held in interlocking operation with the output shaft 22. In other words, the rotary motion is input from the output shaft 22 of the automatic transmission 20 to the second electric motor M2, which consequently acts as a rotary shaft to be rotated in an interlocking state with the input rotary motion. Under such a state, the rotation direction detection means 92 detects the rotation direction of the second electric motor M2, placed in an area at a preceding stage of the automatic transmission 20, that is upstream of the automatic transmission 20 in the drive power transmitting direction thereby discriminating the rotation direction of the output shaft 22 of the automatic transmission 20.

More particularly, under a circumstance where the coupling elements (first clutch C1 and third brake B3) are engaged for establishing the 1st-speed gear position, the rotation direction of the output shaft 22 is discriminated to lie in a normal direction (forward running direction) in the presence of the rotation direction of the second electric motor M2 being detected in the normal direction. In contrast, if the rotation direction of the second electric motor M2 is discriminated to lie in a reverse rotation (rearward running direction), then, the rotation direction of the output shaft 22 is discriminated to lie in the reverse rotation.

Under a circumstance where the coupling elements (second clutch C1 and third brake B3) are engaged for establishing the reverse running gear position, the rotation direction of the output shaft 22 is discriminated to lie in a reverse rotation (reverse running direction) in the presence of the rotation direction of the second electric motor M2 being detected in the normal rotation. In contrast, if the rotation direction of the second electric motor M2 is discriminated to lie in the reverse rotation, then, the rotation direction of the output shaft 22 is discriminated to lie in the normal direction.

Figure 10:
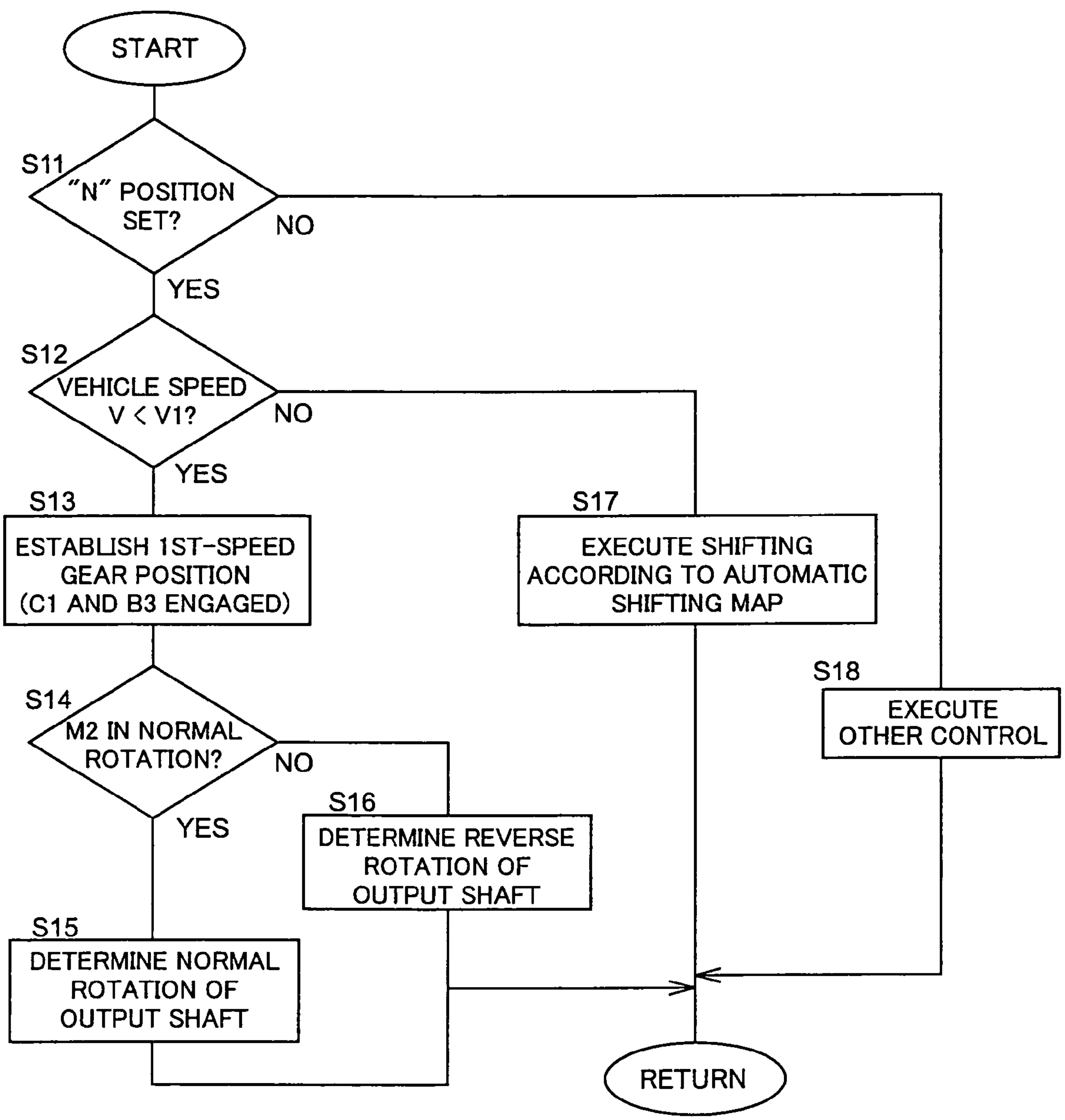
FIG. 10 is a flowchart illustrating a basic sequence of control operations to be executed by the electronic control unit shown in FIG. 4, i.e., a basic sequence of control operations to be executed for determining a rotation direction of an output shaft of an automatic transmission portion in a neutral state.

FIG. 10 is a flow chart illustrating a basic sequence of major control operations to be executed in the electronic control unit, i.e., a basic sequence of control operations for discriminating the rotation direction of the output shaft 22. This sequence is repeatedly executed in an extremely short cycle time of the order of approximately, for instance, several milliseconds or several tens milliseconds. Also, in the illustrated flow chart, for the 1st-speed gear position to be established during the engagement, it is supposed that the first clutch C1 and third brake B3 are engaged.

Referring to FIG. 10, in step (hereinafter, the term "step" will be omitted) S11 corresponding to the shift position determination means 88, the current shift position of the shift lever 52 is determined based on the signal indicative of the shift position $P_{SH}$ of the shift lever 52. In particular, the determination is made whether or not the current shift position of the shift lever 52 lies in the "N" position under which none of the first and second clutches C1 and C2 and first to third brakes B1 to B3 are disengaged. During a phase in which the shift position $P_{SH}$ of the shift lever 52 remains in the "N" position, the differential portion 11 is brought into the power cut-off state with no torque transfer being enabled.

If the determination S11 is made negative, then, in S18, the other control such as the shift control or the like is executed and the current operation is terminated.

If the determination S11 is made positive, then, in S12 corresponding to the vehicle speed determination means 90, the determination is made whether or not the current vehicle speed V exceeds the given vehicle speed V1. If the determination S12 is made negative, then, in S17, the automatic shifting portion 20 executes a normal automatic control in accordance with the shifting lines shown in FIG. 8 and the current routine is terminated.

If the determination S12 is made positive, then, the operation proceeds to S13 in which the automatic shifting portion 20 establishes the 1st-speed gear position "1st", i.e., the first clutch C1 and third brake B3 are engaged. In S14 corresponding to the rotation direction determination means 92, the determination is made as to whether or not the second electric motor M2 rotates in the normal direction (in the forward running direction).

If the determination S14 is made positive, then, S15, it is determined that the output shaft 22 of the automatic shifting portion 20 rotates in the normal direction (in the forward running direction) and the current routine is terminated. On the contrary, if the determination S14 is made negative, then, S16, it is determined that the output shaft 22 of the automatic shifting portion 20 rotates in the reverse rotation (in the reverse running direction) and the current routine is terminated. Here, S11 to S16 correspond to the rotation direction determination means 86.

As set forth above, the control device of the present embodiment includes the rotation direction determination means 86 that is operative to determine the rotation direction of the output shaft 22 of the automatic shifting portion 20 in response to the detected results on the given coupling element being engaged, that i.e., during engagement in the automatic shifting portion 20 and rotation direction detection means 92. Therefore, the rotation direction of the output shaft 22 of the automatic shifting portion 20 can be suitably detected without additionally increasing the number of component parts such as a rotation speed sensor or the like.

In the illustrated embodiment, the rotation direction determination means 86 determines the rotation direction of the output shaft 22 upon detecting the rotation direction based on the rotation speed of the second electric motor M2. Accordingly, the rotation direction of the output shaft 22 of the automatic shifting portion 20 can be suitably detected without additionally increasing the number of component parts such as a rotation speed sensor or the like.

In the illustrated embodiment, when the neutral state is established with the power transmitting path between the differential portion 11 and the automatic shifting portion 20 being interrupted, the given coupling element is engaged and the differential portion 11 is controlled in the power cut-off state during the operation to detect the rotation direction. Therefore, the rotation direction of the output shaft 22 of the automatic shifting portion 20, unavailable to be detected under a normal operation, can be detected under the neutral state. In addition, with the differential portion 11 controllably placed in the power cut-off state under the neutral condition, even if the given coupling element is engaged, a whole of the automatic shifting portion 20 is maintained in the neutral condition. This blocks a variation in a running state of the vehicle due to the coupling element being engaged.

In the illustrated first embodiment, the given coupling element includes the coupling element (B3) that is commonly rendered operative to be engaged for both the gear positions on the 1st-sped gear position and the reverse running gear position. Therefore, preliminarily engaging the common coupling element (B3) when establishing the forward running or reverse running gear position from the neutral position reduces the number of coupling elements to be engaged for the engagement operations, thereby enabling the shift operation to be immediately executed.

In the illustrated embodiment, the electrically controlled differential portion 11 and automatic shifting portion 20 constitute the continuously variable transmission, enabling drive torque to be smoothly varied. In addition, the electrically controlled differential portion 11 may be configured to continuously vary the speed ratio to thereby operate as the electrically controlled continuously variable transmission and to stepwise vary the speed ratio to thereby operate as the step-variable transmission.

In the illustrated embodiment, the electrically controlled differential portion 11, caused to function as the electrically controlled continuously variable transmission, and step-variable type automatic shifting portion 20 constitute the continuously variable transmission. This enables drive torque to be smoothly varied. In addition, with the electrically controlled differential portion 11 controlled so as to allow the speed ratio at a fixed level, the electrically controlled differential portion 11 and step-variable type automatic shifting portion 20 establish the same state as that of the step-variable transmission. This causes the vehicular drive system to vary the overall speed ratio step-by-step, enabling drive torque to be immediately varied.

Next, another embodiment of the present invention will be described. Here, in the following description, the component parts common to those of the embodiment described above bear like reference numerals to omit the description.

<Second Embodiment>

In the second illustrated embodiment, the rotation direction determination means 86 can be applied to a situation under which the differential portion 11 is switched from the power cut-off state to the power transmitting state under a so-called "N→D" shift mode, enabling the determination of the output shaft 22 of the automatic shifting portion 20. During such switching operation, the relevant coupling element begins to be engaged, after which the rotation direction determination means 86 begins to detect the rotation direction.

Figure 11:
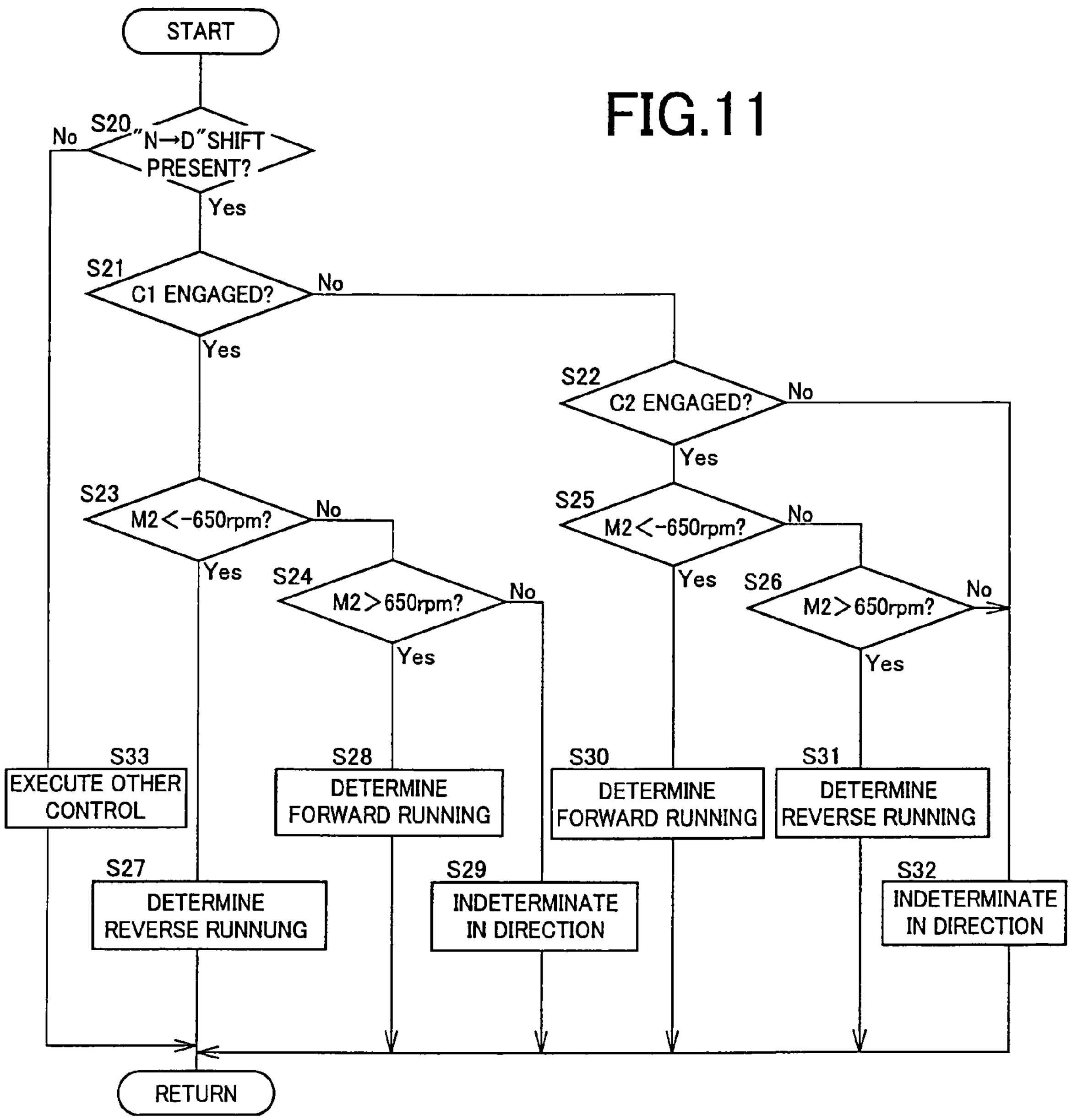
FIG. 11 is another flowchart illustrating a basic sequence of control operations to be executed by the electronic control unit shown in FIG. 4, i.e., a basic sequence of control operations to be executed for determining the rotation direction of the output shaft of the automatic transmission portion in the neutral state.
Figure 12:
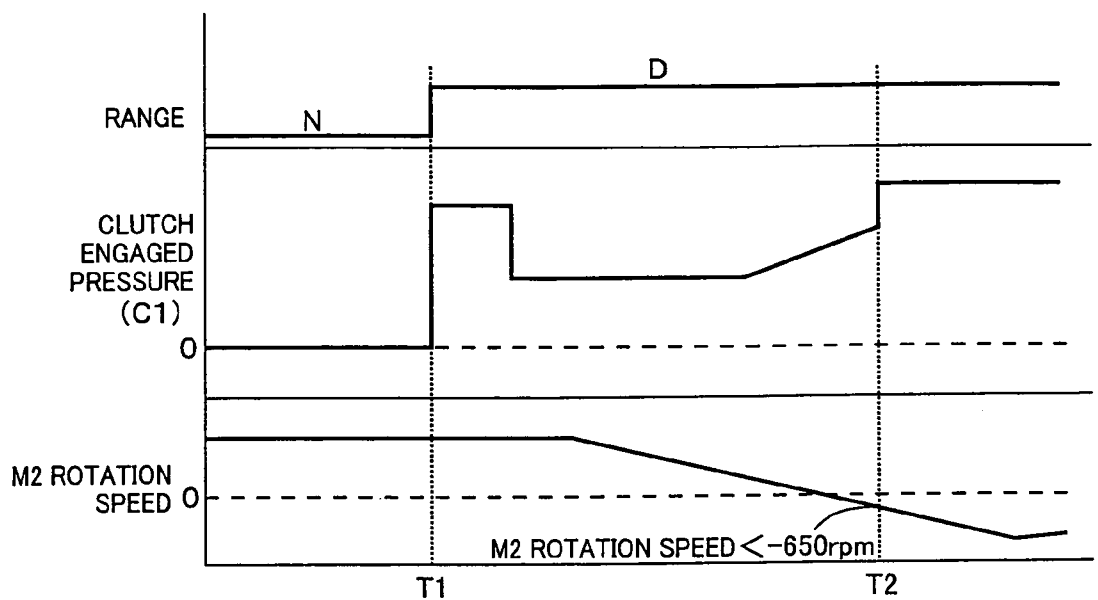
FIG. 12 is a timing chart showing states of a clutch engaging pressure of a given coupling element engaged during a "N→D" shift, and a rotation speed of a second electric motor.

FIG. 11 is a flowchart illustrating a basic sequence of control operations to be executed by the rotation direction determination means 86 under the "N→D" shift mode for determining the rotation direction. FIG. 12 is one example of a timing chart representing the engagement pressure of the given engaging element to be engaged under the "N→D" shift mode and a status of the rotation speed $N_{M2}$ of the second electric motor M2. During the "N→D" shift mode, the 1st-speed gear position is established under which the first clutch C1 is engaged.

The flowchart of FIG. 11 will now be described. First, in S20, the determination is made whether or not the shift lever of the shift operation device 50 is shifted from the "N" range to "D" range or "R" range. If the determination in S20 is made negative, then, in S33, the other control is executed.

If the determination in S20 is made positive, then in S21, the operation is executed to determine whether or not the first clutch C1, to be engaged when the forward running gear position is selected, is engaged. If the determination in S21 is made positive, then in S23, the operation is executed to determine whether or not the rotation speed $N_{M2}$ of the second, electric motor M2 is less than a value of, for instance, −650 rpm that is preset as a second given rotation speed. If the determination in S23 is made positive, then, the second electric motor M2 is caused to rotate in a reverse rotation and the first clutch C1, to be engaged when the forward running gear position is selected, is engaged. Thus, the operation in S27 is executed to determine that the vehicle remains under the reverse-drive state with the output shaft 22 of the automatic shifting portion 20 rotating in the reverse rotation.

If the determination in S23 is made negative, then in S24, the operation is executed to determine whether or not the rotation speed $N_{M2}$ of the second electric motor M2 is less than a value of, for instance, −650 rpm preset as a first given rotation speed. If the determination in S24 is made positive, then, the operation in S21 is executed to cause the second electric motor M2 to rotate in a normal direction and the first clutch C1, serving as the coupling element for the forward running gear position, is engaged. Thus, the operation in S28 is executed to determine that the vehicle remains under the forward running state with the output shaft 22 of the automatic shifting portion 20 caused to rotate in the normal direction.

If the determination in S24 is made negative, then, the rotation speed $N_{M2}$ of the second electric motor M2 remains in a range between −650 rpm and 650 rpm. Under such a situation with the rotation speed $N_{M2}$ of the second electric motor M2 remaining in the range close proximity to a zeroed rotation speed, it is conceived that the rotation speed is fluctuating due to a unsteadiness in rotation speed of the second electric motor M2. Therefore, in S29, the determination is made that the rotation speed is indeterminate.

The values of the first and second given rotation speeds are obtained on preliminary experiments and set to values in consideration of the unsteadiness in rotation speed of the second electric motor M2. Especially, just after the engagement of the N→D shift, unsteadiness in the rotation speed of the second electric motor M2 is large. In view of such circumstance, the first given rotation speed is set to a relatively high value and the second given rotation speed is set to a relatively low value. This avoids the occurrence of erroneous detection of the rotation direction due to the unsteadiness in rotation speed of the second electric motor M2.

In determining the rotation direction of the output shaft 22 based on the second electric motor M2, the first and second rotation speeds, serving as threshold values, can be altered to values for the engagement or disengagement (for stationary time) of the coupling element such as, for instance, the first clutch C1. With the coupling element being engaged, for instance, an unsteadiness in the rotation speed $N_{M2}$ of the second electric motor M2 increases. Therefore, setting the first rotation speed to an increased value while setting the second rotation speed to a decreased level (with an increase in a negative direction) avoids the erroneous detection of the rotation direction of the second electric motor M2. On the contrary, with the coupling element remained disengaged (for stationary time), the rotation speed $N_{M2}$ of the second electric motor M2 has a relatively lessened unsteadiness. Therefore, the first and second rotation speeds are set to values close proximity to zero.

In contrast, if the determination in S21 is made negative, then in S22, the operation is executed to determine whether or not the second clutch C2, to be engaged when the reverse running gear position is selected, is engaged. If the determination in S22 is made positive, then, the determination is made on whether or not the rotation speed $N_{M2}$ of the second electric motor M2 is less than the value of −650 rpm preset as the second given rotation speed. If the determination in S25 is made positive, then, the second electric motor M2 is caused to rotate in the reverse rotation, and the second clutch C2 to be engaged when the reverse running gear position is selected is engaged. Thus, the operation in S30 is executed to determine that the vehicle remains under the forward running state with the output shaft 22 of the automatic shifting portion 20 caused to rotate in the normal direction.

If the determination in S25 is made negative, then in S26, the operation is executed to determine whether or not the rotation speed $N_{M2}$ of the second electric motor M2 is greater than the value of 650 rpm preset as the first given rotation speed. If the determination in S26 is made positive, then, the second electric motor M2 is caused to rotate in the normal direction, and the second clutch C2 to be engaged when the reverse running gear position is selected is engaged. Thus, the operation in S31 is executed to determine that the vehicle remains under the reverse-drive state with the output shaft 22 of the automatic shifting portion 20 caused to rotate in the reverse rotation.

If the determination in S26 is made negative, then, the rotation speed $N_{M2}$ of the second electric motor M2 remains in a range between −650 rpm and 650 rpm. When this takes place, it is conceived that unsteadiness takes place in the rotation speed $N_{M2}$ due to the unsteadiness in rotation speed of the second electric motor M2, it is determined in S32 that the rotation speed is indeterminate. In other words, the rotation direction of the output shaft 22 of the automatic shifting portion 20 is determined depending on whether the rotation speed $N_{M2}$ of the second electric motor M2 exceeds a value of 650 rpm representing the first rotation speed, or whether it is less than a value of −650 rpm representing the second rotation speed.

Due to the first and second clutches C1 and C2 remained under the disengaged states, if the determination in S22 is made negative, this represents that the power transmitting state is interrupted between the differential portion 11 and drive wheels 34 due to some failure. That is, this means that the path i.e., route between the second electric motor M2 and drive wheels 34 are kept in the power cut-off state. In such a way, the determination is made that the rotation direction is indeterminate.

Next, one example of control operation for the "N→D" shift mode will be described below with reference to the time chart shown in FIG. 12. At time T1, the shift operation device 50 is shifted to switch from the "N" position to the "D" position (corresponding to S20 in FIG. 11). Then, the clutch engaging pressure of the first clutch C1 is rapidly raised (quick application). Subsequently, the first clutch C1 is completely engaged by sweep control (corresponding to S21) at time T2. This enables the rotation speed $N_{M2}$ and rotation direction of the second electric motor M2 to be detected. In the timing chart shown in FIG. 12, at time T2, the rotation speed $N_{M2}$ of the second electric motor M2 is less than −650 rpm (corresponding to S23) and the determination is made (corresponding to S27) that the vehicle runs in a rearward direction.

In the second illustrated embodiment, as set forth above, during a switching mode in which the power transmitting path is switched from the neutral state to the power transmitting state, the operation is executed to determine the rotation direction of the output shaft 22 after the engagement of the given coupling element is commenced. Therefore, the rotation direction of the output shaft 22 is determined under a condition where the output shaft 22 of the automatic shifting portion 20 and differential portion 11 remain engaged in the power transmitting state. This allows the rotation direction of the output shaft 22 to be accurately detected during the switching mode.

In the second illustrated embodiment, the rotation direction of the output shaft 22 is detected depending on whether the rotation speed of the second electric motor M2 is greater than the first given rotation speed or less than the second rotation speed. This avoids the occurrence of erroneous detection caused by the unsteadiness in rotation speed of the second electric motor M2.

<Third Embodiment>

Figure 13:
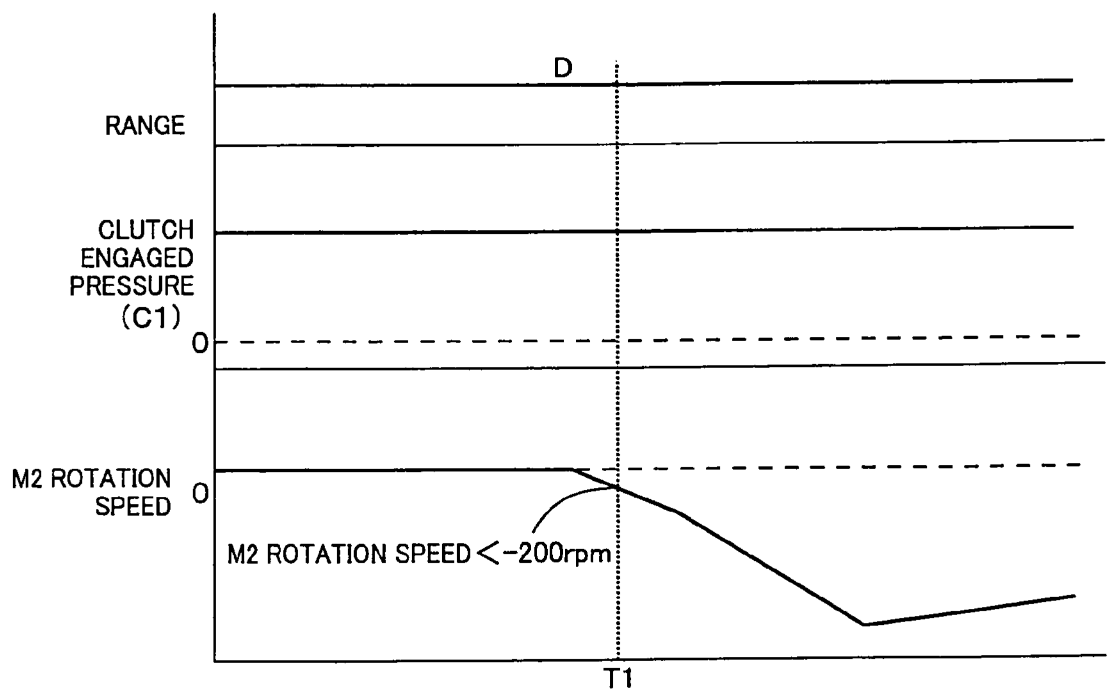
FIG. 13 is another timing chart showing the states of the clutch engaging pressure of the given coupling element engaged in the "D" position, and the rotation speed of the second electric motor.

In a third illustrated embodiment, the rotation direction determination means 86 can implement the determination on the rotation direction even in the presence of the power transmitting state such as a phase in, for instance, the "D" position (drive position). FIG. 13 shows one example of a timing chart representing the clutch engaging pressure of the given coupling element engaged when the "D" position is selected for instance, and a status of the rotation speed $N_{M2}$ of the second electric motor M2. The third embodiment will also be described below with reference to an example of a status under which the first clutch C1, engaged when the forward running gear position is selected, is engaged as the given coupling element.

With the shift operation device 50 selected in the "D" position, the first clutch C1 is adequately supplied with the clutch engaging pressure at all times. In this moment, the rotation direction determination means 86 determines the rotation direction for, for instance, a given time interval according to the flowchart shown in FIG. 14. In the flowchart shown in FIG. 14, because the rotation direction is executed in nearly the same flow in the flowchart shown in FIG. 11 with a difference in part, the description will be made with a focus on such a differing point.

In S40, shift position determination means 88 determines whether a current running position is placed in the "D" position or "R" position. If the determination in S40 is made negative, then in S53, the other control is executed. If the determination in S40 is made positive, then, the operation proceeds to S41 to determine the rotation direction in accordance with the same flowchart as that shown in FIG. 11.

Figure 14:
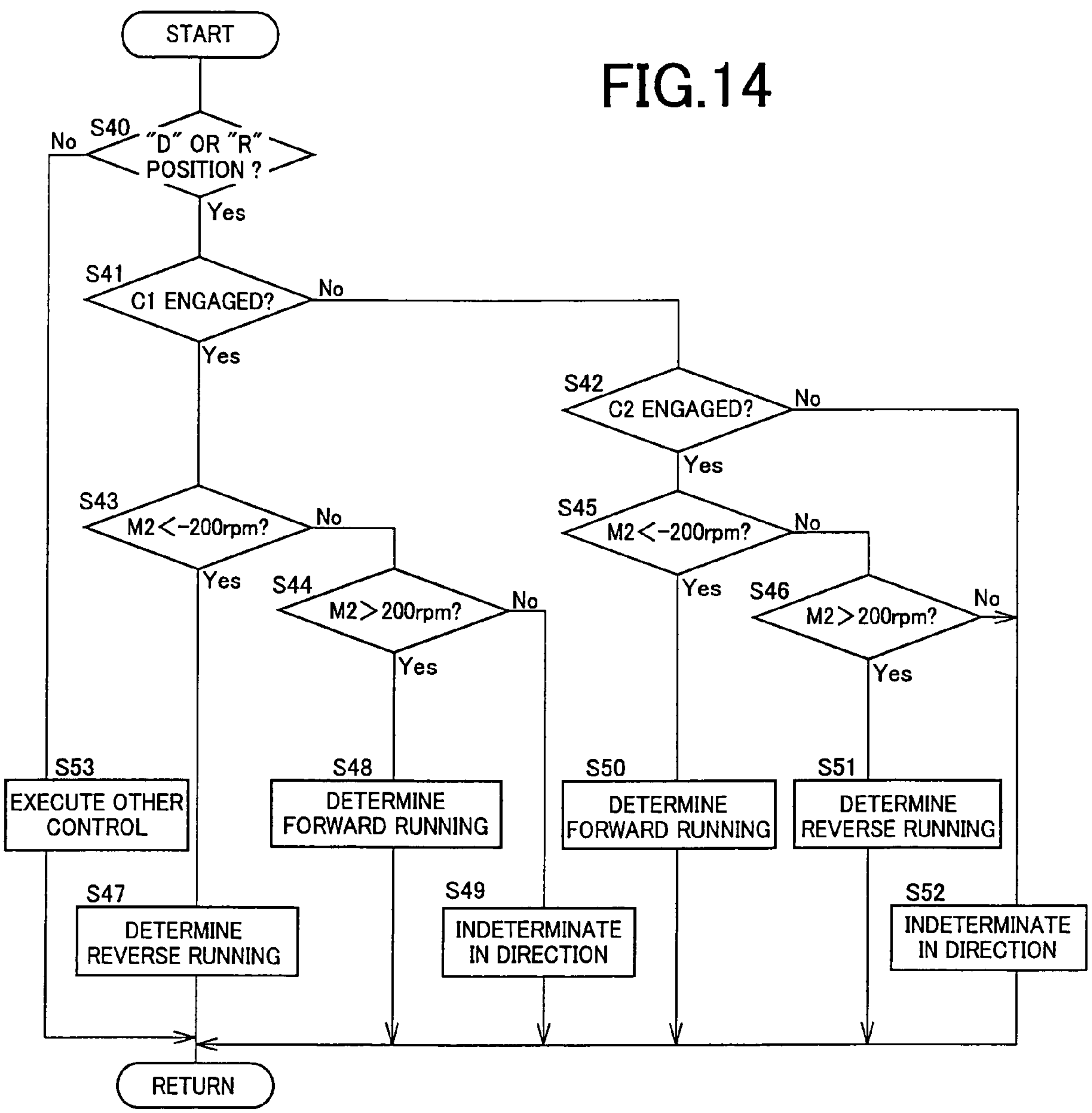
FIG. 14 is another timing chart illustrating a basic sequence of control operations to be executed by the electronic control unit shown in FIG. 4, i.e., a basic sequence of control operations to be executed for determining the rotation direction of the output shaft of the automatic transmission portion in the neutral state.

In the third illustrated embodiment, as shown in FIG. 14, the first given rotation speed is set to a value of 200 rpm and the second given rotation speed is set to a value of −200 rpm (see the operations in S 43 to S46).

Thus, with the "D" or "R" positions being placed, a rotational speed range (ranging from −200 rpm to 200 rpm) for the rotation direction regarded to be incertitude, is set to a small value in consideration of unsteadiness in rotation speed of the second electric motor M2. During a time period in which the drive position, such as the "D" position or "R" position is selected, the automatic shifting portion 20 remains in a steady state with no variation taking place in the coupling state. When this takes place, the unsteadiness of the second electric motor M2 is minimized in rotation speed. This makes it possible to detect the rotation direction even if the rotation speed range is set in the small value.

FIG. 13 shows a status wherein the vehicle running on an ascending road for instance, is caused to run rearward due to a slope of the road. As shown in FIG. 13, as the second electric motor M2 is caused to rotate in the reverse rotation with the rotation speed $N_{M2}$ dropped in a value less than −200 rpm, then, the determination is made that the vehicle is brought into a reverse running condition.

In the third illustrated embodiment, as set forth above, even when the drive position such as the "D" position is selected, executing the operation of the rotation direction determination means 86 enables the rotation direction of the output shaft 22 of the automatic transmission 20 to be detected. With the drive position being selected, further, the automatic shifting portion 20 remains in the steady state with no variation taking place in the coupling state, thereby minimizing the unsteadiness in rotation speed of the second electric motor M2. This provides an increased rotational speed range enabling the rotation direction to be detected.

<Fourth Embodiment>

In a fourth illustrated embodiment, rotation direction detection means 92 determines the rotation direction of the output shaft 22 of the automatic shifting portion 20, in response to a detected result on an estimated rotation speed of the first electric motor M1, detected by a resolver mounted on the first electric motor M1 in place of the second electric motor M2.

In addition, the estimated rotation speed, detected by the resolver of the first electric motor M1, includes a sign of the rotation direction, i.e., a rotation speed even covering a sign indicative of normal and reverse rotations. This makes it possible to detect the rotation direction of the output shaft 22.

Figure 15:
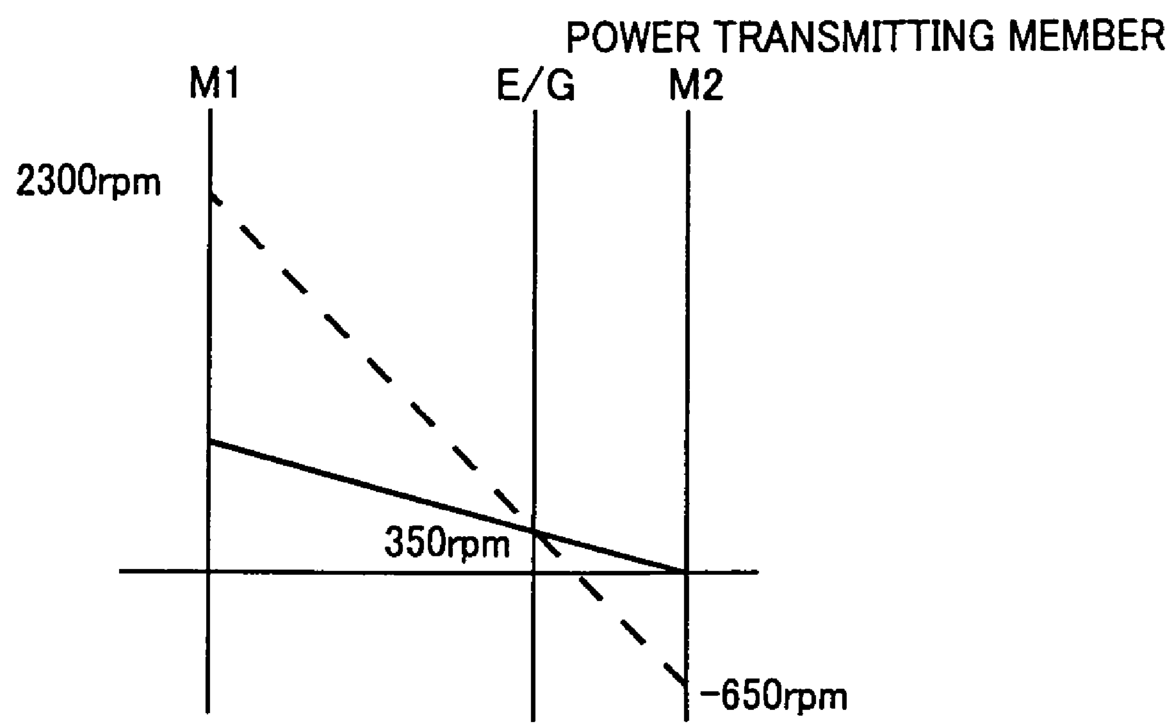
FIG. 15 is a collinear chart, showing the relative motion relationship on the rotation speeds of various rotary elements of a differential portion, which corresponds to FIG. 3.

FIG. 15 is a collinear chart showing the relative motion relationship among the rotation speeds of the various rotary elements of the differential portion 11 and corresponds to FIG. 3. Further, FIG. 15 shows the relative rotation speeds in the presence of the "N→R" shift mode as one example. Solid lines represent rotary states of the rotary elements before the shifting, i.e., when the shift is placed in the "N" position (neutral state). A broken line represents the rotary states of the rotary elements after the shifting, i.e., when the shift is placed to the "R" position.

Here, the rotation speed $N_{M1}$ and rotation direction of the first electric motor M1 are estimated (calculated) based on the rotation speed $N_{18}$ of the power transmitting member 18, gear ratio ρ(=0.418) of the differential portion 11 and rotation speed $N_E$ of the engine 8. For instance, on a stage after the shift has been initiated as shown by the broken line, if the power transmitting member 18 is caused to rotate at a speed of −650 rpm with the engine 8 caused to rotate at a speed in the vicinity of 350 rpm, the estimated rotation speed $N_{M1}$ of the first electric motor M1 reaches a value of approximately 2300 rpm. Thus, the rotation direction of the output shaft 22 of the automatic shifting portion 20 can be determined based on the rotation speed $N_E$ of the engine 8 and estimated rotation speed of the first electric motor M1.

Even in the fourth illustrated embodiment, the rotation direction of the output shaft 22 of the automatic shifting portion 20 can be determined based on whether the estimated rotation speed of the first electric motor M1 is greater than the first given rotation speed, or less than the second given rotation speed. Here, in the illustrated embodiment, the first and second rotation speeds are set to values obtained on experiments or set to theoretically appropriate values.

In the fourth illustrated embodiment, as set forth above, the rotation direction determination means 86 can determine the rotation direction of the output shaft 22 of the automatic shifting portion 20 in response to the detected result on the estimated rotation speed of the first electric motor M1. The rotation direction determination means 86 can determine the rotation direction of the output shaft 22 of the automatic shifting portion 20 depending on whether the estimated rotation speed of the first electric motor M1 is greater than the first given rotation speed or less than the second given rotation speed. This avoids the occurrence of erroneous detection of the rotation direction arising from unsteadiness in estimated rotation speed of the first electric motor M1.

In the foregoing, while the various embodiments have been described above with reference to the accompanying drawings, the present invention may be implemented in other modes.

For instance, the first to fourth embodiments have been described with reference to the phase in which the rotation direction determination means 86 executes the control operations depending on the vehicle conditions, respectively. However, each of these embodiments may suffice to be implemented in suitable combination.

In the various illustrated embodiments set forth above, concrete numeric values of the first and second given rotation speeds may be altered depending on performances of the first and second electric motors M1 and M2 or the structure of the vehicle in a freely variable range.

While the illustrated embodiments have been described above with reference to the aspects in which the rotation direction of the output shaft 22 of the automatic shifting portion 20 is detected for the neutral state, "N→D" shift mode and drive mode. However, even if the shifting is executed during the running of the vehicle for instance, the rotation direction can be determined using the same controls as those executed for the "N→D" shift mode.

In the illustrated embodiments set forth above, with a view to permitting the second electric motor M2 and output shaft 22 of the automatic shifting portion 20 to operate in the interlocking relationship with each other, the coupling element for the 1st-speed gear position to be established is engaged as the given coupling element. However, no particular limitation to the 1st-gear position is intended, and the rotation direction of the output shaft 22 of the automatic shifting portion 20 can be determined even when engaging the frictional coupling element for the forward running gear position such as the 2nd-speed gear position, or the reverse-drive position to be established. However, for the reverse running gear position being placed, the second electric motor M2 and output shaft 22 rotate in the reverse rotation.

In the illustrated embodiments set forth above, the resolver 72 is used as the rotation direction detection means 92. However, it doesn't matter if the resolver 72 is replaced with other devices, such as a magnetic encoder or the like, provided that they can detect the rotation direction of the second electric motor M2.

In the illustrated embodiments set forth above, the differential portion 11 is of the type that functions as the electrically controlled continuously variable transmission in which the gear ratio γ0 is continuously varied from the minimal value of γ0min to the maximal value of γ0max. However, it will be appreciated that the present invention can be applied to, for instance, a structure in which the gear ratio γ0 is not continuously varied but is varied step-by-step using a differential action.

In the illustrated embodiments set forth above, the differential portion 11 may be of the type that includes a differential action limitation device provided in the power distributing mechanism 16 and operative to limit a differential action to render the differential portion 11 operative to serve as at least the step-variable transmission of the forward two-drive positions.

With the power distribution mechanisms 16 of the illustrated embodiments described above, the first carrier CA1 is connected to the engine 8, first sun gear S1 is connected to the first electric motor M1, and the first ring gear R1 is connected to the power transmitting member 18. However, the present invention is not necessarily limited to such connecting arrangement and the engine 8, first electric motor M1 and power transmitting member 18 have no objection to be connected to either one of the three elements CA1, S1 and R1 of the first planetary gear set 24.

Although in the illustrated embodiments described above, the engine 8 is directly connected to the input shaft 14, it may be connected to the input shaft 14 via, for instance, gears, belts or the like, and no need arises for these component parts to be necessarily disposed on a common axis.

In the illustrated embodiments set forth above, the first and second electric motors M1 and M2 are coaxially disposed on the input shaft 14, the first electric motor M1 is connected to the first sun gear S1, and the second electric motor M2 is connected to the power transmitting member 18. However, no need arises for these component parts to be necessarily placed in such connecting arrangement. For example, the first electric motor M1 may be connected to the first sun gear S1, and the second electric motor M2 may be connected to the power transmitting member 18 through gears, a belt or the like.

In the illustrated embodiments mentioned above, the hydraulically operated frictional coupling devices such as the first and second clutches C1 and C2 may include magnetic type clutches such as powder (magnetic powder) clutches, electromagnetic clutches and meshing type dog clutches, and electromagnetic type and mechanical coupling devices. For instance, with the electromagnetic clutches being employed, the hydraulic control circuit 70 may not include a valve device for switching the hydraulic passages and may be replaced with a switching device or electromagnetically operated switching device or the like that are operative to switch electrical command signal circuits for electromagnetic clutches.

In the illustrated embodiments set forth above, the automatic shifting portion 20 is connected to the differential portion 11 in series via the power transmitting member 18. However, a countershaft may be provided in parallel to the input shaft 14 to allow the automatic shifting portion 20 to be concentrically provided therewith. In such an alternative, the differential portion 11 and automatic shifting portion 20 may be connected to each other for power transmissive state by means of the power transmitting member 18 including, for instance, a counter gear pair and one set of transmitting members composed of sprockets and chains.

Further, the power distributing mechanism 16 of the illustrated embodiments may include, for instance, a differential gear set in which a pinion, rotatably driven with the engine, and a pair of bevel gears, held in meshing engagement with the pinion, are operatively connected to the first electric motor M1 and power transmitting member 18 (second electric motor M2).

The power distributing mechanism 16 of the illustrated embodiments has been described above as including one set of planetary gear units, the power distributing mechanism 16 may include two or more sets of planetary gear units that are arranged to function as a transmission having three or more speed positions under a non-differential state (fixed shifting state). In addition, the planetary gear unit is not limited to the single-pinion type, but may be of a double-pinion type.

While the shift operation device 50 of the illustrated embodiments has been described with reference to the shift lever 52 operative to select a plurality of kinds of shift positions $P_{SH}$, the shift lever 52 may be replaced with other type of switches or devices. These may include, for instance: a select switch such as a press-button type switch and a slide-type switch available to select one of a plurality of shift positions $P_{SH}$; a device operative to switch a plurality of shift positions $P_{SH}$ in response not to the manipulation initiated by the hand but to a driver's voice; and a device operative to switch a plurality of shift positions $P_{SH}$ in response to the manipulation initiated by the foot.

While the illustrated embodiment has been described with reference to the shifting range that is established upon manipulating the shift lever 52 to the "M" position, the gear positions may be set, i.e., maximal speed gear positions for respective shifting ranges may be set as the gear positions. In this case, the automatic shifting portion 20 operates so as to allow the gear positions to be switched for executing the shifting action. For example, as the shift lever 52 is manually shifted to an upshift position "+" or a downshift position "−" in the "M" position, the automatic shifting portion 20 operates so as to allow any of the 1st-speed gear position to the 4th-speed gear position to be set depending on the shifting manipulation of the shift lever 52.

The foregoing merely illustrates the embodiments for illustrating the principles of the present invention. It will be appreciated by those skilled in the art that various modifications and alternatives to those details could be developed in the light of the overall teachings of the disclosure.

What is claimed is:

1. A control device for a vehicular drive system having a power drive source, and a mechanical type power transmitting portion composed of a plurality of coupling elements disposed between the power drive source and drive wheels and operative in combination to change a rotation direction of a drive power delivered from the power drive source, a rotation direction of an output shaft of the mechanical type power transmitting portion being changed by changing a combination of coupling elements to be coupled in the plurality of coupling elements, the control device being comprised of a rotation direction determination portion configured to determine a rotation direction of the output shaft of the mechanical type power transmitting portion based on a rotational speed in a preceding stage of the mechanical type power transmitting portion and a given coupling element under engagement of the mechanical type power transmitting portion.

2. The control device for a vehicular drive system according to claim 1, wherein the vehicular drive system includes (i) an electrically controlled differential portion operative to control an operating state of a first electric motor disposed on a succeeding stage of the power drive source and connected to a rotary element of a differential mechanism, for controlling a differential state between an input-shaft rotation speed and an output-shaft rotation speed thereof, and (ii) the mechanical type power transmitting portion and a second electric motor both disposed on a power transmitting path between the electrically controlled differential portion and the drive wheels in a power transmissive state, and the control device further includes rotation direction detection means for detecting a rotation direction of the first electric motor or the second electric motor, and the rotation direction determination means determines the rotation direction of the output shaft of the mechanical type power transmitting portion based on the given coupling element during engagement of the mechanical type power transmitting portion, and a detected result by the rotation direction detection means.

3. The control device for a vehicular drive system according to claim 1, wherein the mechanical type power transmitting portion of the vehicular drive system is a step-variable type automatic transmission.

4. The control device for a vehicular drive system according to claim 2, wherein the rotation direction determination means detects the rotation direction based on the rotation direction of the first electric motor or the second electric motor for thereby determining the rotation direction of the output shaft of the mechanical type power transmitting portion.

5. The control device for a vehicular drive system according to claim 2, wherein the rotation direction determination means determines the rotation direction of the output shaft of the mechanical type power transmitting portion depending on whether the rotation direction of the first electric motor or the second electric motor is greater than a first given rotation speed or less than a second given rotation speed.

6. The control device for a vehicular drive system according to claim 2, wherein the rotation direction determination means determines the rotation direction of the output shaft of the mechanical type power transmitting portion depending on whether an estimated rotation speed of the firs electric motor is greater than a first given rotation speed or less than a second given rotation speed.

7. The control device for a vehicular drive system according to claim 2, wherein the rotation direction determination means, in a neutral state in which a power transmitting path between the electrically controlled differential portion and the mechanical type power transmitting portion is interrupted, causes the given coupling element to be engaged and controls the electrically controlled differential portion in a power cut-off state upon detecting the rotation direction by the rotation direction detection means.

8. The control device for a vehicular drive system according to claim 2, wherein the rotation direction determination means allows the rotation direction detection means to begin detecting the rotation direction after the given coupling element began to be engaged, during switching of the power transmitting path from the power cut-off state to the power transmitting state.

9. The control device for a vehicular drive system according to claim 2, wherein the electrically controlled differential portion of the vehicular drive system is rendered operative as a continuously variable transmission with controlling an operating state of the first electric motor.

10. The control device for a vehicular drive system according to claim 4, wherein the rotation direction determination means determines the rotation direction of the output shaft of the mechanical type power transmitting portion depending on whether the rotation direction of the first electric motor or the second electric motor is greater than a first given rotation speed or less than a second given rotation speed.

11. The control device for a vehicular drive system according to claim 4, wherein the rotation direction determination means determines the rotation direction of the output shaft of the mechanical type power transmitting portion depending on whether an estimated rotation speed of the first electric motor is greater than a first given rotation speed or less than a second given rotation speed.

12. The control device for a vehicular drive system according to claim 5, wherein the first given rotation speed and second given rotation speed of the first electric motor or the second electric motor are set so that the first given rotation speed and the second given rotation speed are set to be altered depending on the switchover and the steady state of the power transmitting path.

13. The control device for a vehicular drive system according to claim 12, wherein the first given rotation speed is set in an increased level and the second given rotation speed is set in a decreased level during the switchover of the power transmitting path, and the first given rotation speed is set in a decreased level and the second given rotation speed is set in an increased level during the steady state of the power transmitting path.

14. The control device for a vehicular drive system according to claim 7, wherein the given coupling element of the vehicular drive system includes a coupling element engageable for both gear positions in a forward running gear position and a reverse running gear position.

15. The control device for a vehicular drive system according to claim 8, wherein the given coupling element of the vehicular drive system includes a coupling element engageable for both gear positions in a forward running gear position and a reverse running gear position.

* * * * *